(12) United States Patent
Cok et al.

(10) Patent No.: US 8,169,389 B2
(45) Date of Patent: May 1, 2012

(54) CONVERTING THREE-COMPONENT TO FOUR-COMPONENT IMAGE

(75) Inventors: Ronald S. Cok, Rochester, NY (US); Michael E. Miller, Honeoye Falls, NY (US)

(73) Assignee: Global OLED Technology LLC, Herndon, VA (US)

( * ) Notice: Subject to any disclaimer, the term of this patent is extended or adjusted under 35 U.S.C. 154(b) by 883 days.

(21) Appl. No.: 12/174,085

(22) Filed: Jul. 16, 2008

(65) Prior Publication Data

US 2010/0013748 A1    Jan. 21, 2010

(51) Int. Cl.
*G09G 3/32* (2006.01)
*G09G 5/02* (2006.01)
*G09G 3/36* (2006.01)

(52) U.S. Cl. ............................. 345/83; 345/591; 345/88
(58) Field of Classification Search ........................ None
See application file for complete search history.

(56) References Cited

U.S. PATENT DOCUMENTS

| | | | |
|---|---|---|---|
| 6,384,529 B2 | 5/2002 | Tang et al. | |
| 6,453,067 B1 | 9/2002 | Morgan et al. | |
| 6,885,330 B2 | 4/2005 | Trotter et al. | |
| 6,897,876 B2 | 5/2005 | Murdoch et al. | |
| 6,919,681 B2 | 7/2005 | Cok et al. | |
| 6,987,355 B2 | 1/2006 | Cok | |
| 7,301,543 B2 | 11/2007 | Higgins | |
| 2003/0165266 A1 | 9/2003 | Kagawa et al. | |
| 2004/0113875 A1 | 6/2004 | Miller et al. | |
| 2004/0263528 A1* | 12/2004 | Murdoch et al. | 345/600 |
| 2005/0212728 A1 | 9/2005 | Miller et al. | |
| 2006/0256053 A1* | 11/2006 | Baek, II | 345/88 |
| 2007/0139326 A1* | 6/2007 | Kwon | 345/88 |
| 2007/0139437 A1 | 6/2007 | Boroson et al. | |
| 2007/0171218 A1* | 7/2007 | Hong et al. | 345/211 |
| 2007/0182682 A1* | 8/2007 | Hong et al. | 345/88 |
| 2007/0279372 A1 | 12/2007 | Brown Elliott et al. | |
| 2008/0150958 A1* | 6/2008 | Higgins | 345/591 |
| 2008/0180384 A1* | 7/2008 | Aoki et al. | 345/102 |
| 2008/0204480 A1* | 8/2008 | Van Mourik et al. | 345/690 |
| 2009/0002564 A1 | 1/2009 | Barnhoefer et al. | |
| 2009/0086094 A1* | 4/2009 | Lee | 348/453 |

FOREIGN PATENT DOCUMENTS

| | | |
|---|---|---|
| EP | 1 475 771 A2 | 11/2004 |
| WO | WO 2006/077554 A2 | 7/2006 |
| WO | WO 2007/004194 A2 | 1/2007 |

OTHER PUBLICATIONS

Lee et al, TFT-LCD with RGBW Color System, 2003 Proc. of Society for Information Display Conf.
Wang et al, Trade-off between Luminance and Color in RGBW Displays for Mobile-phone Usage, 2007 Proc. of the Society for Information Display. Conf.

* cited by examiner

*Primary Examiner* — Bipin Shalwala
*Assistant Examiner* — Daniel Bedell
(74) *Attorney, Agent, or Firm* — Morgan, Lewis & Bockius LLP

(57) ABSTRACT

A method of converting a three-or-more-color-component image input signal to an image output signal includes acquiring an input signal having a plurality of pixel signals, each pixel signal having three, or more, color components; determining a residual difference for each color component of each pixel signal; determining a limit value of the residual differences; calculating a common scale factor for each of the color components based upon the limit value; and applying the common scale factor to the image input signal to produce the image output signal.

11 Claims, 16 Drawing Sheets

CONVERTING THREE-COMPONENT TO FOUR-COMPONENT IMAGE

FIELD OF THE INVENTION

The present invention relates to image processing techniques for presenting images on electronic displays, and more particularly, to methods for providing images with increased brightness on displays having four, or more, colors of light-emitting elements.

BACKGROUND OF THE INVENTION

Flat-panel display devices are widely used in conjunction with computing devices, in portable devices, and for entertainment devices such as televisions. Such displays typically employ a plurality of pixels distributed over a substrate to display images. Each pixel incorporates several, differently-colored sub-pixels or light-emitting elements, typically red, green, and blue, to represent each image element. A variety of flat-panel display technologies are known, for example plasma displays, liquid crystal displays, and light-emitting diode displays. To present images on these displays, the display typically receives a three-color-component image input signal containing a signal for driving each pixel (i.e., pixel signals), each pixel signal including separate color-component image signals for driving the red, green, and blue sub-pixels.

Light-emitting diodes (LEDs) incorporating thin films of light-emitting materials have many advantages in a flat-panel display device and are useful in optical systems. U.S. Pat. No. 6,384,529 to Tang et al. shows an organic LED color display that includes an array of organic LED light-emitting elements (sub-pixels). Alternatively, inorganic materials can be employed and can include phosphorescent crystals or quantum dots in a polycrystalline semiconductor matrix. Other thin films of organic or inorganic materials can also be employed to control charge injection, charge transport, or charge blocking to the light-emitting-thin-film materials, and are known in the art. The materials are placed upon a substrate between electrodes, with an encapsulating cover layer or plate. Light is emitted from a pixel when a current is passed through an organic material. The frequency of the emitted light is dependent on the nature of the material used. In such a display, light can be emitted through the substrate (a bottom emitter) or through the encapsulating cover (a top emitter), or both.

These thin-film LED devices can include a patterned light-emissive layer wherein different materials are employed in the pattern to emit different colors of light when current passes through the materials. However, patterning the materials, particularly small-molecule organic LED materials, is difficult for large substrates, thereby increasing manufacturing costs. Moreover, existing patterning methods, for example employing metal shadow masks, are expensive and can damage deposited organic materials. One approach to overcoming material deposition problems on large substrates is to employ a single emissive layer, for example, a white-light emitter, together with color filters for forming a full-color display, as is taught in U.S. Pat. No. 6,987,355 by Cok. It is also known to employ a white-light-emitting element that does not include a color filter, for example, as taught in U.S. Pat. No. 6,919,681 by Cok et al. A design employing an unpatterned white emitter has been proposed which includes red, green, and blue color filters to form red, green, and blue sub-pixels and an unfiltered white sub-pixel to improve the efficiency of the device as taught in U.S. Patent Publication No. 2004/0113875 by Miller et al.

However, since most imaging systems provide a three-color-component image input signal to a display, it is necessary to employ a conversion method to convert an incoming three-color-component image signal to a four-or-more-color-component image signal for driving displays having sub-pixels for emitting four or more colors of light such as the display described by Miller et al referenced above. Therefore, several methods have been developed to convert a three-color-component image input signal to a four-or-more-color-component image signal suitable for driving a four-color display.

Within this art, it is recognized that there is redundancy provided by having sub-pixels for emitting more than three colors of light and that this redundancy can be used to simultaneously drive four sub-pixel colors to produce images having an increased luminance. For example, Morgan et al. in U.S. Pat. No. 6,453,067; Lee et al. in a paper entitled "TFT-LCD with RGBW Color System", published in the 2003 Proceedings of the Society for Information Display Conference, Wang et al. in a paper entitled "Trade-off between Luminance and Color in RGBW Displays for Mobile-phone Usage", published in the 2007 Proceedings of the Society for Information Display Conference; and Higgins in U.S. Pat. No. 7,301,543 provide methods for providing such a conversion method for liquid crystal displays having red, green, blue and white sub-pixels in which a white sub-pixel within each pixel can be driven simultaneously with red, green, and blue sub-pixels in the same pixel to produce a luminance higher than can be produced by employing only the RGB light-emitting elements to form the same chromaticity. However, each of these processing methods introduces chromatic errors. Specifically, since more luminance is added by the white sub-pixel than is removed from the red, green, and blue sub-pixels, the resulting image is desaturated. As discussed by Wang et al. (referenced above) the improved brightness with reduced color saturation can improve the image quality of some images but will degrade the quality of other images.

It should be noted, that some of these references, most notably Lee et al., mistakenly state that their algorithms do not introduce color error. However the method discussed by Lee et al. introduces very significant color errors. The method proposed by Lee et al. includes determining a minimum of the red, green, and blue color-component image input signals for each pixel from each of the red, green, and blue color-component image input signals and using this value to drive the white sub-pixel in their display. This method provides two undesirable changes to the resulting image signal. First, since the minimum of the red, green, and blue input signal values for each pixel corresponds to the neutral (white) light to be emitted by each pixel and because this value is added to the white color signal without subtracting it from the red, green, and blue color signals, each pixel will emit more white light than requested in the input signal. Secondly, the less saturated the input pixel color is (i.e., the larger the minimum of the red, green, and blue color-component image signals within each pixel signal), the more white light is added by the white channel. Therefore, the ratio of the luminance produced by each pixel to the maximum luminance for each pixel is different for each output pixel than is required to produce the image indicated by the three-color-component image input signal.

The impact of these manipulations can be determined based upon the CIE 1976 (L*a*b*) color-difference metric, which can be used to compare the perceived difference between two colors. To demonstrate the effect of the algorithm proposed by Lee et al., it is important to assume some characteristics of a display upon which the resulting image is to be produced. An OLED display will be assumed having a white-light emitter and color filters. The red, green, and blue sub-pixels will emit light having sRGB primaries with CIE 1931 x,y chromaticity coordinates of 0.64, 0.33 for red, 0.30, 0.60 for green and 0.15, 0.06 for blue. The white sub-pixel will produce D65 illumination (CIE 1931 x,y chromaticity coordinates of 0.313, 0.329). The luminance output of these emitters will be normalized such that D65 light with a peak luminance of 200 cd/sq m will be produced by either the maximum combined intensities of the red, green, and blue sub-pixels or by the maximum intensity of the white sub-pixel. To understand the impact of the algorithm proposed by Lee et al., two colors must be assumed to be displayed on both an RGB display receiving the input RGB signal and an RGBW display receiving the converted RGBW signal produced by the algorithm discussed by Lee et al. A pure yellow patch will be chosen, having red and green luminance intensity values of 1 and a blue luminance intensity of 0. The second color required is a reference white, having an input red, green, and blue intensity of 1. Using this algorithm, the converted intensities for the yellow is found by computing the minimum of 1 for red, 1 for green, and 0 for blue, which is equal to 0. Therefore the resulting output RGBW values are 1 for red, 1 for green, 0 for blue, and 0 for white. For the white color, the red, green, and blue values are all 1, the minimum of these values is 1, and therefore the white color will be rendered with 1 for red, 1 for green, 1 for blue and 1 for white. Using a typical primary matrix for the primaries shown above, the yellow patch will therefore be rendered with a sub-pixel luminance of 43 $cd/m^2$ for red, 143 $cd/m^2$ for green to provide a total luminance of 186 $cd/m^2$ at x,y coordinates of 0.419, 0.505, on both the RGB and RGBW displays. White will be rendered with a luminance of 43 $cd/m^2$ for red, 143 $cd/m^2$ for green, 14 $cd/m^2$ for blue for both the RGB and RGBW displays. However, based upon Lee's algorithm, the RGBW display will have an additional 200 $cd/m^2$ of luminance, which is produced by the white sub-pixel, providing a white luminance that is twice as high for the RGBW display as was produced for the RGB display. Using the white values as the adapting or reference display color, the CIE 1976 (L*a*b*) color difference metric provides a value of 39 between the yellow color shown on the RGB and RGBW display. Since a difference in this metric value of 1 is detectable by a user for a single patch and average values on the order of 3 are detectable for a natural image, the color produced by these two displays are clearly different.

Alternative methods for converting a three-color-component image input signal to a four-or-more-color-component image input signal can also be performed in such a way as to preserve the color accuracy of an image. For example, Murdoch et al. in U.S. Pat. No. 6,897,876, Primerano et al. in U.S. Pat. No. 6,885,380, and Miller et al. in U.S. Patent Application Publication No. 2005/0212728 have discussed such methods. However, as disclosed, the peak image luminance cannot exceed the combined peak luminance of the red, green, and blue light-emitting elements at the chromaticity coordinates of the additional primary, without reducing the color saturation. Other algorithms, such as those described by Boroson et al. in U.S. Patent Application Publication No. 2007/0139437 permit the luminance produced by the white to be higher than is produced by the combined luminance of the red, green, and blue sub-pixels but reduces the relative luminance of highly saturated colors, once again reducing color fidelity.

Recently, LCD displays have been discussed having backlights with adjustable luminance. One such display is described by Brown Elliott et al. in U.S. Publication 2007/0279372. As described within this publication, an algorithm is used to analyze an input RGB image signal, dynamically adjust the luminance produced by the backlight and to convert the RGB signal to an RGBW signal, increasing a scale value within this conversion when decreasing the luminance of the backlight or decreasing a scale value within this conversion when increasing the luminance of the backlight. While this method has the potential to provide displays with a peak display luminance that is higher than the combined peak luminance of the red, green, and blue light-emitting elements without introducing larger color errors, it has at least three problems. First, it can not be implemented for emissive displays, such as organic light-emitting diode displays, since these displays have no backlight to adjust. Secondly, for these transmissive displays increasing the backlight luminance increases the inadvertent leakage of light through dark sub-pixels, reducing color accuracy in the shadow regions of the images, and third, this method requires extra hardware, which can add significant cost to the resulting display.

None of the prior-art conversion methods permit the use of four light-emitting elements to provide luminance values higher than the combined luminance red, green, and blue light-emitting elements without introducing significant color errors or adding the expense of controlling the luminance of backlights. There still remains a need, therefore, for an improved method for rendering image scenes in display devices and, in particular, for emissive displays, such as EL displays, having more than three colors of sub-pixels with a peak display luminance that is higher than the combined peak luminance of the red, green, and blue light-emitting elements, without introducing significant color errors.

SUMMARY OF THE INVENTION

One aspect of the present invention includes a method of converting a three-or-more-color-component image input signal to an image output signal comprising:

(a) acquiring an input signal including a plurality of pixel signals, each pixel signal having three, or more, color components;

(b) determining a residual difference for each color component of each pixel signal;

(c) determining a limit value of the residual differences;

(d) calculating a common scale factor for each of the color components based upon the limit value; and (e) applying the common scale factor to the image input signal to produce the image output signal.

The present invention has the advantage that it increases the dynamic range of a display having four-or-more sub-pixels when displaying most typical images or permits the images to be displayed with reduced power consumption. This is achieved without the need for additional or specialized electronics and is especially useful for reducing power consumption of EL displays without introducing noticeable artifacts, including color error.

DETAILED DESCRIPTION OF THE INVENTION

Figure 1:
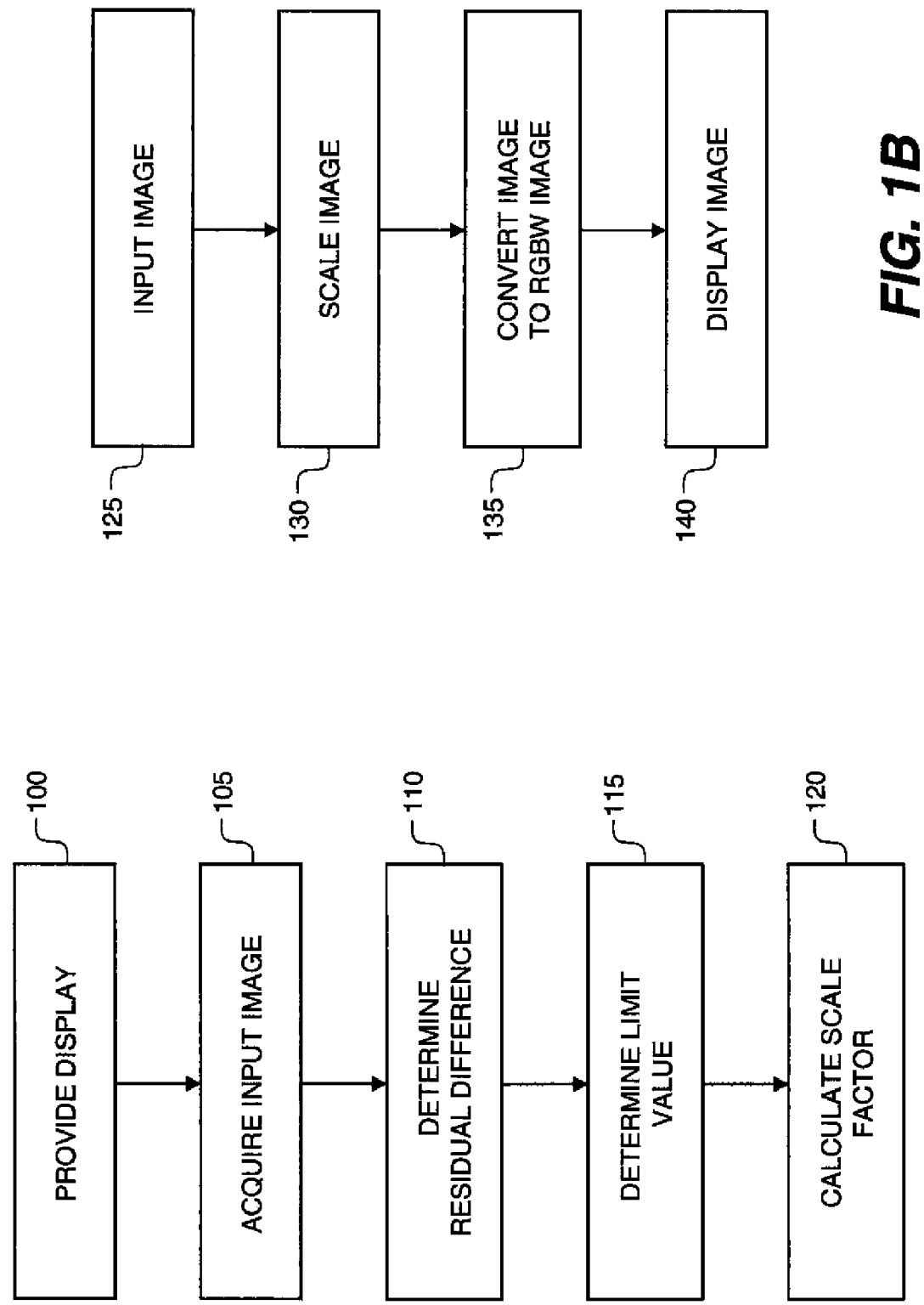
FIG. 1A and FIG. 1B are flow diagrams according to an embodiment of the method of the present invention.

By employing the method of the present invention, a typical input image signal can be converted to an output signal for driving a four-or-more-color display device including red, green, blue, and one additional, color sub-pixel to increase the luminance of the display. Specifically, the method of the present invention converts a three-or-more-color-component image input signal to an image output signal that can be used to drive the four-or-more-color display device such that it produces a peak display luminance that is higher than the combined peak luminance of the red, green, and blue sub-pixels. This method can be employed to 1) provide this conversion without introducing color errors, 2) provide this conversion with a limited magnitude of color errors, or 3) permit color errors within a limited number of sub-pixels of the displayed image.

In one embodiment, the additional-color sub-pixel can emit white light and the display device can be an RGBW display device. Referring to FIG. 1A, according to a method of the present invention, a display can be provided (Step 100) and a three-or-more-color-component image input signal can be converted to an image output signal by acquiring (Step 105) an input signal including a plurality of pixel signals, each pixel signal having three-or-more color components, determining (Step 110) a residual difference for each color component of each pixel signal indicating the portion of the three-or-more-color-component image input signal that must be produced by the red, green, and blue light-emitting elements to avoid color error, determining 115 a limit value of the residual differences, and calculating (Step 120) a common scale factor for each of the color components based upon the limit value. The limit value can be the maximum, or a value approaching the maximum, of the residual differences but must be sufficiently close to the maximum of the residual differences to avoid unacceptable color error and to achieve a white luminance value greater than can be achieved with only the red, green, and blue color luminance values. Referring to FIG. 1B, the same or another image signal can be input (Step 125) and the common scale factor applied (Step 130) to the input signal to produce a scaled image output signal. The scaled image output signal can then be converted (Step 135) to an output image signal including at least one additional color component image signal (e.g. a four-color-component image signal as is required for driving the RGBW display device) and displaying (Step 140) the four-color-component image signal on a four-or-more-color-component display (e.g., a display having red, green, blue, and white sub-pixels). A more detailed version of such a method is provided in FIG. 8A and FIG. 8B and will be described below. In an alternative embodiment of the present invention, the input signal can be a four-color-component image signal and the entire method of the present invention can be applied to the four-color-component image input signal or the input signal. In yet another alternative embodiment of the present invention, the input signal can be a three-color-component image input signal and the image output signal can be a three-color-component image signal, which is converted to a four-or-more-color-component image signal at a later time for display on a four-or-more-color-component display.

The residual difference for an image signal is the portion of the three-or-more-color-component image input signal that must be produced by the red, green, and blue light-emitting elements to avoid color error and can be the difference between the maximum color value of a color channel and the maximum common value of all of the color channels taken together (the color component limit). The value MIN(R, G, B) can be the color component limit. Alternatively, the color component limit can be any value sufficiently close to the MIN(R, G, B) value to prevent unacceptable color error. For example, the residual difference for a color channel R can be equal to R-MIN(R, G, B), the residual difference for a color channel G can be equal to G-MIN(R, G, B), the residual difference for a color channel B can be equal to B-MIN(R, G, B). Essentially, the residual difference corresponds to the saturated portion of the color signal for each color channel. The color error is any perceptible difference between the color specified in the image signal and the color of the converted signal.

Figure 2:
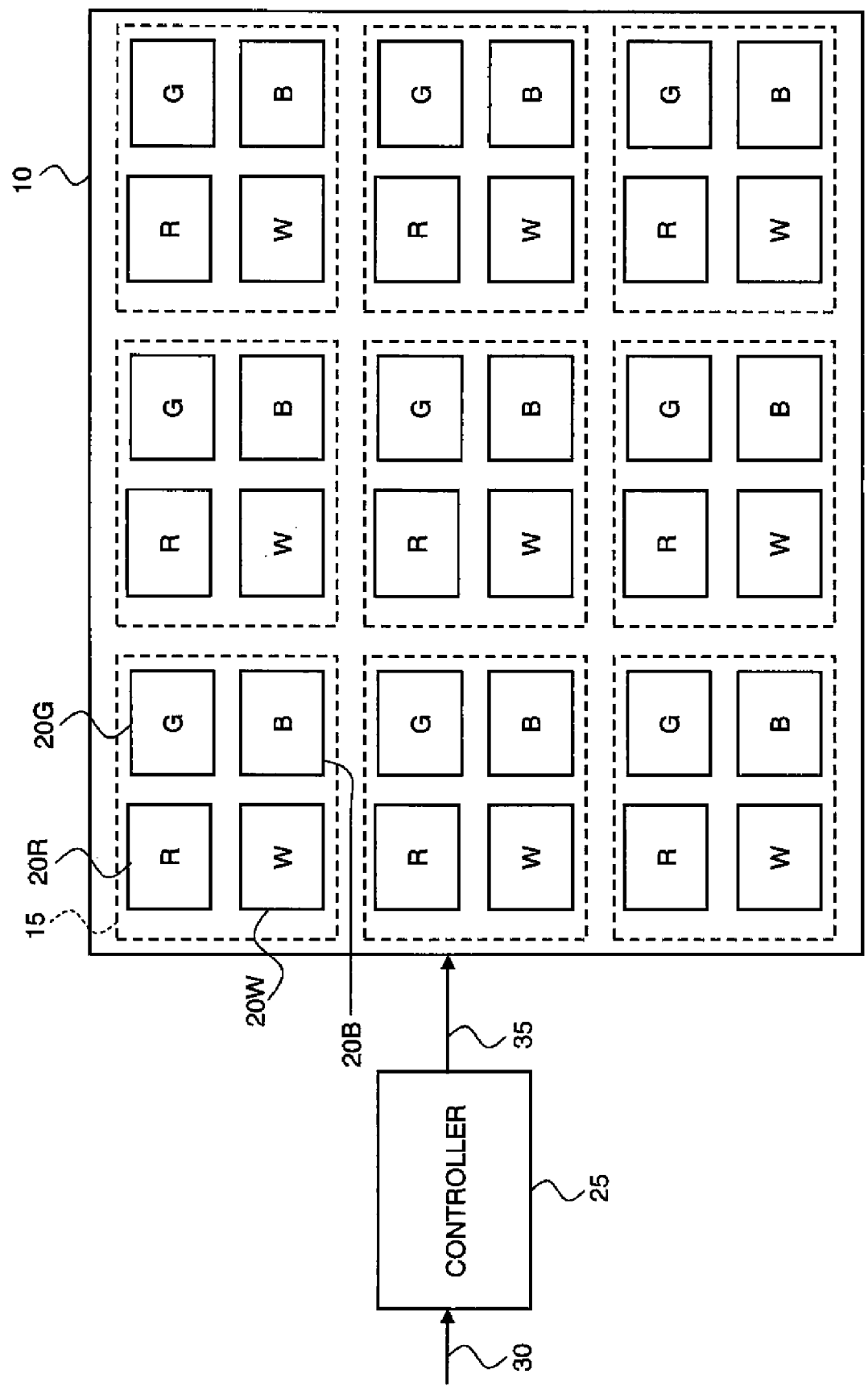
FIG. 2 is a schematic of a display system, including a display having four-color pixels formed thereon, useful with the present invention.

In a detailed embodiment of this method, an RGBW OLED display can be provided, such as the one depicted in FIG. 2. As shown in FIG. 2, the RGBW OLED display 10 includes an array of pixels 15 and each pixel contains a repeating array of sub-pixels. As shown in this figure, each pixel 15 contains a red 20R, green 20G, blue 20B, and white 20W sub-pixel. Also shown in FIG. 2 is a controller 25 capable of acquiring (Step 105 from FIG. 1) an input signal 30, processing this input signal using the method of the present invention and providing a drive signal 35 to the display 10 to display (Step 140 from FIG. 1) the image. This RGBW OLED display 10 can be formed by coating a white-emitting OLED onto a substrate and applying color filters over the red 20R, green 20G, and blue 20B sub-pixels to filter the white emission from the OLED to produce red, green, and blue light, as is known in the art. The white sub-pixel 20W can produce light that is not filtered.

Figure 3:
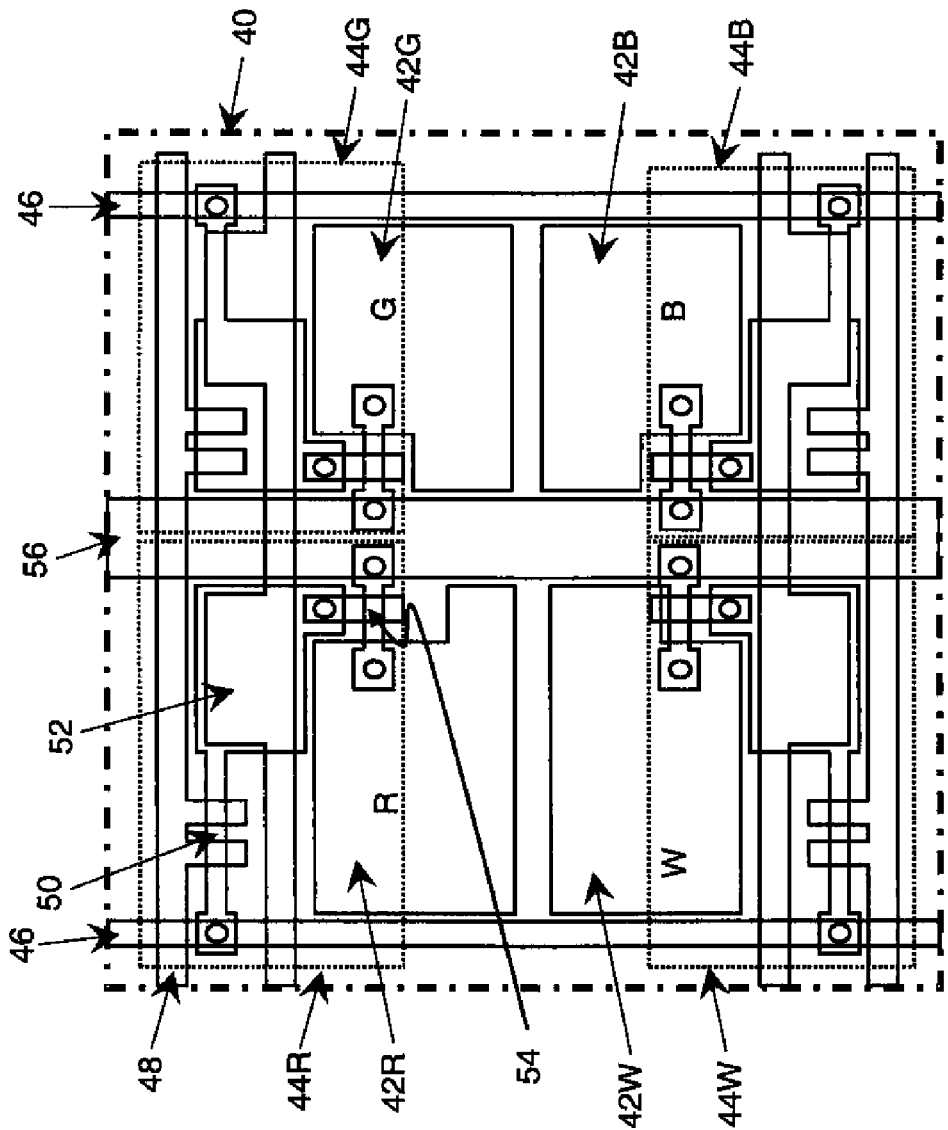
FIG. 3 is a top view of a portion of an active-matrix substrate for an EL display useful with the present invention.
Figure 4:
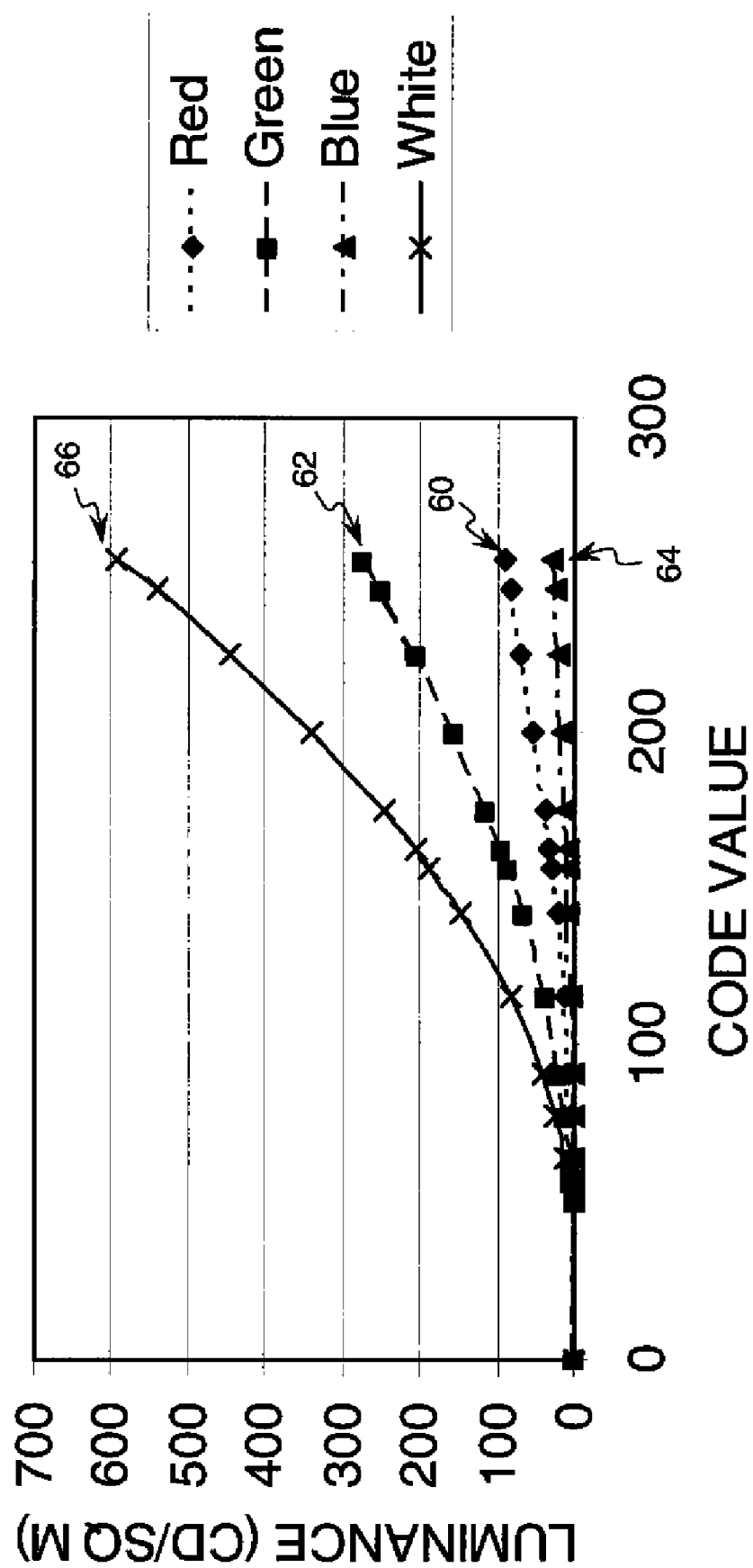
FIG. 4 is a graph illustrating the relationship of luminance output for red, green, blue, and white sub-pixels as a function of input code value for an EL display useful in understanding the present invention.

FIG. 3 shows a portion 40 of a substrate for the OLED display with electrodes 42R, 42G, 42B, 42W for the red 20R, green 20G, blue 20B and white 20W sub-pixels of FIG. 2, respectively. Each electrode 42R, 42G, 42B, 42W, and therefore, each corresponding sub-pixel 20R, 20G, 20B, 20W in FIG. 2 receives power from a corresponding circuit 44R, 44G, 44B, and 44W. Each circuit controls the current or voltage provided to each of the electrodes to control the luminance provided by each sub-pixel. For example, a drive signal is provided to circuit 44R on drive lines 46 when a select signal is provided on the select row 48 which activates a select thin-film transistor (TFT) 50. When the select TFT 50 is activated, a voltage can flow from the drive line 46 to charge a capacitor 52. Once the capacitor 52 is charged, the select signal can be removed from the select line 48, closing the select TFT 50 and permitting the charge to remain on the capacitor 52. When a voltage is provided on the capacitor 52, this voltage controls the gate of a power TFT 54, which, in turn, permits power to flow from a power line 56 to the electrode 42R and through the OLED to a second electrode (not shown) parallel to the electrode 42R but on the opposing side of the OLED from the electrode 42R. The flow of this current through the OLED causes the sub-pixel to produce light having a luminance. Note that the power TFT 54 has a finite size and therefore is only capable of permitting a certain maximum current to flow to through each sub-pixel. Therefore, the circuit 44R provides a maximum current, which limits the luminance output of each sub-pixel in the display 10 to a maximum luminance, which cannot be exceeded. When the circuits are each designed and manufactured to have the same characteristics, each color sub-pixel will typically have the same current limit. However, because each color sub-pixel 20R, 20G, 20B, 20W shown in FIG. 2 has a different luminance efficiency due to having different color filters, they will typically have different maximum luminance values. The luminance response of the display in response to changes in sub-pixel code value, corresponding to different currents, for a typical display of this type is shown in FIG. 4. Note that these curves do not indicate the luminance of individual sub-pixels but represent luminance values collected over an area of the display containing several pixels. As this figure shows, the luminance output 60, 62, 64, 66 for each respective sub-pixel 20R, 20G, 20B, 20W shown in FIG. 2 increases as a function of a code value within the drive signal 35 shown in FIG. 2. However, the rate of increase differs for each sub-pixel as the luminance efficiency of each sub-pixel is different, ranging from lowest to highest as the color changes from blue 64, to red 60, to green 62, to white 66. In this display, the highest luminance that is produced by the display when combining the luminance output of the red, green, and blue sub-pixels 20R, 20G, 20B, is approximately 400 cd/m². However, the luminance output 66 of the white sub-pixel 20W is approximately 600 cd/m², which is significantly greater than the combination white point of 400 cd/m², obtained by adding (i.e, combining) the maximum luminance of the red 20R, green 20G, and blue 20B sub-pixels. Therefore, the display can achieve a significantly higher luminance using the detailed method of the present invention for converting a three-or-more-color-component image input signal to a four-color-component output image signal appropriate for driving this display, wherein this method uses the peak luminance of the sub-pixel 20W, without introducing undesirable color errors.

Figure 15:
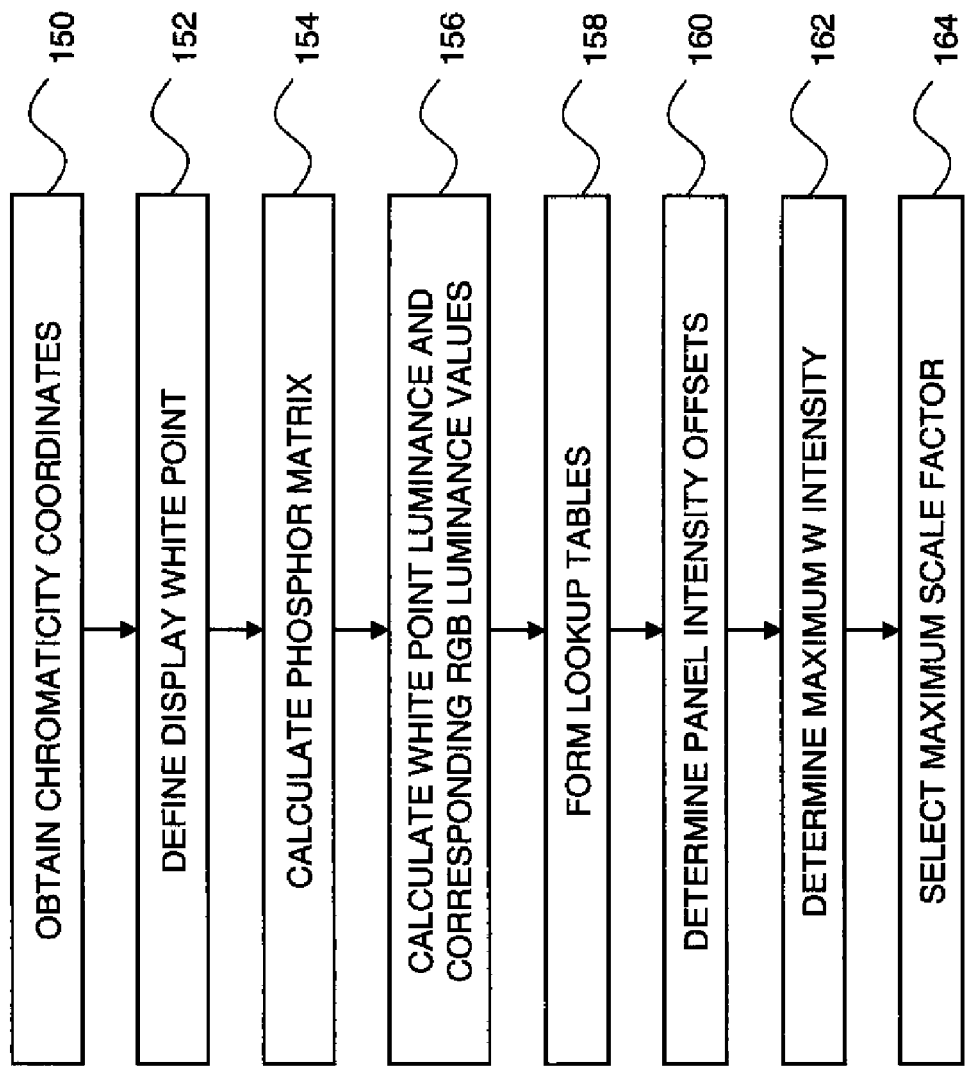
FIG. 15 is a flow diagram of a method for providing a display according to an embodiment of the present invention.

In this detailed embodiment, the display 10 shown in FIG. 2 is provided (Step 100 in FIG. 1). Within this step, certain display-dependent information is ascertained and processed to enable this embodiment. This process is shown in further detail in FIG. 15. In this process, the chromaticity coordinates of the light emitted from each of the sub-pixels is obtained (Step 150). To provide an example of this method, the display 10 in FIG. 2 will be assumed to have sub-pixels 20R, 20G, 20B, and 20W, which emit light at CIE 1931 x,y chromaticity coordinates of (0.64, 0.33) for red, (0.30, 0.60) for green, (0.15, 0.06) for blue and (0.313, 0.329) for white. A display white point will also be defined (Step 152). In this example, a display white point of (0.313, 0.329) will be assumed. Using the CIE 1931 chromaticity coordinates for the red, green, blue and white sub-pixels and the CIE 1931 chromaticity coordinates for the display white point, one can calculate (Step 154) a phosphor matrix as is well known in the art by computing a matrix for converting the x,y coordinates of the red, green, and blue sub-pixels to the tristimulus values of the display white point. This phosphor matrix will contain defined luminance ratios for forming the white point of the display from light emitted by the red, green, and blue sub-pixels. For the coordinates given in this example, the proportion of luminance to be created from the red, green, and blue sub-pixels to create white-light emission at the coordinates of the display white point are 21.3% red, 71.5% green and 7.2% blue. Using these ratios, the highest luminance white point that can be created from the light that can be produced by the red, green, and blue sub-pixels can be calculated (Step 156) by calculating the maximum luminance that each of the red, green, and blue sub-pixels can be driven to produce light having the chromaticity coordinates of the display white point using the luminance response functions shown in FIG. 4. In this example, these maximum luminance values are 81.9 cd/m² for red, 275.6 cd/m² for green and 27.8 cd/m² for blue. Combining these luminance values, the assumed display will have a white point with a luminance of 385.3 cd/m². Since the white sub-pixel emits light at the white point of the display, this same white-point luminance can be created by summing light from the red, green, and blue sub-pixels or by driving the white sub-pixel to a luminance of 385.3 cd/m². Using the tonescales shown in FIG. 4, lookup tables can be formed (Step 158), which provide a mapping from panel intensity values to the output luminance values of each of the light-emitting elements 20R, 20G, 20B, and 20W in FIG. 2. These lookup tables are formed by normalizing the red, green, and blue luminance values shown in FIG. 4 by their respective maximum luminance values from step 156. Similarly, the white luminance values shown in FIG. 4 is normalized by the display white-point luminance. The lookup table for the values shown in FIG. 4 at 15 different points within the display tonescale are shown in Table 1. However, this lookup table will typically have as many entries as possible code values and permit the lookup of code values to drive the display as a function of panel intensity value for each color channel.

TABLE 1

Lookup table for RGBW channels

| Red Intensity | Green Intensity | Blue Intensity | White Intensity | Code Value |
|---|---|---|---|---|
| 0.000 | 0.000 | 0.000 | 0.000 | 0 |
| 0.003 | 0.003 | 0.003 | 0.005 | 50 |
| 0.011 | 0.010 | 0.010 | 0.015 | 57 |
| 0.021 | 0.018 | 0.019 | 0.028 | 64 |
| 0.044 | 0.039 | 0.041 | 0.061 | 77 |
| 0.078 | 0.070 | 0.072 | 0.107 | 91 |
| 0.156 | 0.139 | 0.144 | 0.215 | 115 |
| 0.274 | 0.245 | 0.252 | 0.377 | 142 |
| 0.354 | 0.316 | 0.326 | 0.487 | 157 |
| 0.389 | 0.347 | 0.358 | 0.535 | 163 |

TABLE 1-continued

Lookup table for RGBW channels

| Red Intensity | Green Intensity | Blue Intensity | White Intensity | Code Value |
|---|---|---|---|---|
| 0.463 | 0.413 | 0.426 | 0.637 | 175 |
| 0.638 | 0.569 | 0.587 | 0.877 | 200 |
| 0.841 | 0.750 | 0.773 | 1.157 | 225 |
| 1.023 | 0.913 | 0.941 | 1.407 | 245 |
| 1.121 | 1.000 | 1.031 | 1.542 | 255 |

As shown in this table, the peak luminance at the display white point that can be formed by a combination of light from the red 20R, green 20G and blue 20B is limited by the peak luminance of the green sub-pixel 20G since the highest panel intensity of the green sub-pixel peak luminance has a value of 1. Slightly higher intensity values can be obtained for the red and blue sub-pixels than are required to form the luminance of the display white point. Panel intensity offsets can be determined (Step 160) for each of the red, green and blue channels by subtracting 1 from each of the maximum of the panel intensity values for each color of light-emitting element shown in Table 1, resulting in a panel intensity offsets of 0.121 for red, 0 for green, and 0.031 for blue. The use of these panel intensity offsets will be further described below. The maximum panel intensity value for the white sub-pixel intensity value can be determined (Step 162) from the maximum value for the white sub-pixel in Table 1. Important to the present invention, this value is over 1.5, indicating that the white sub-pixel can create a luminance at the display white point that is more than 1.5 times the luminance that can be created by combining the output from the red, green, and blue sub-pixels. The maximum common scale factor for the present method is then determined (Step 164). This maximum common scale factor will be assumed to be the maximum intensity value for the white sub-pixel (i.e., 1.542) within this embodiment of the present invention. However, it can be any value less than or equal to the maximum intensity value for the white sub-pixel plus 1.

It is worth noting that a peak display luminance at the display white point can equal 2.542 (i.e., the sum of maximum intensity value for the white sub-pixel and 1, which is by definition the maximum intensity value that can be provided by the red, green, and blue sub-pixels at the white point of the display) by activating all of the sub-pixels within a pixel of the display. This value, or any value less than this value, can be used to define the maximum common scale factor. However, within one EL display embodiment of the present invention, the power efficiency, specified in candelas per amp, of a white color formed by activating only the white sub-pixel within a pixel is much higher than the power efficiency of the same white color formed by activating a combination of the red, green, blue, and white sub-pixels. Therefore, a lower power consumption EL display can be created if the maximum common scale factor is defined as the maximum panel intensity value for the white sub-pixel and the color conversion step preferentially applies luminance from the white sub-pixel 20W in place of luminance from the red 20R, green 20G, or blue 20B sub-pixels.

Once display 10 shown in FIG. 2 is provided (Step 100 in FIG. 1), an input signal including a plurality of pixel signals is acquired 105 as shown in FIG. 1. Each pixel signal can have three, or more, color components. The input signal can additionally include pixel signals for a single image or a series of images. Within this example, and other examples within this disclosure, it is useful to define a series of input images to demonstrate the method. In these examples, the input images will be a series of full-screen color images having the sRGB code values shown in Table 2. Notice that in this example, each image is represented by a different input signal. Each of the pixel signals for each input signal is identical and the sRGB code values shown in Table 2 are the three-color components for each pixel signal.

TABLE 2

Input sRGB Code Values

| Image Color | Red sRGB Code Value | Green sRGB Code Value | Blue sRGB Code Value |
|---|---|---|---|
| Black | 0 | 0 | 0 |
| White | 255 | 255 | 255 |
| Red | 255 | 0 | 0 |
| Pink | 255 | 128 | 128 |
| Salmon | 255 | 196 | 196 |
| White | 255 | 255 | 255 |
| Green | 0 | 255 | 0 |
| Cyan | 0 | 255 | 255 |
| Light Cyan | 128 | 255 | 255 |

During the step 105 of acquiring the input images, the sRGB code values are converted to panel intensity values by first applying the phosphor matrix for the display to rotate the sRGB code values from the sRGB color primaries to the chromaticity coordinates of the red, green, and blue sub-pixels, forming panel code values. A non-linear transform is then applied to transform the input tonescale to linear intensity values which is linearly related to the luminance values of red, green, and blue sub-pixels within a traditional display having only red, green, and blue sub-pixels. When converting sRGB code values to linear intensity values, the nonlinear relationship is defined by the following equation:

$$\text{panel\_intensity} = ((CV/255 + 0.055)/1.055)^{2.4} \text{ if } CV/255 > 0.03928$$

else:

$$\text{panel\_intensity} = CV/(255 * 12.92).$$

where CV is the input code value after the rotation to panel code values. In this example, the panel intensity values that result after these image processing steps will be encoded in a range from zero to one and will represent the proportion of the maximum luminance of the red, green, and blue sub-pixels necessary to form the color specified in the input three-component image signal. Panel intensity values for the code values shown in Table 2 are shown in Table 3.

TABLE 3

Panel Intensity Values for Images of Table 2.

| Image Color | Red Panel Intensity | Green Panel Intensity | Blue Panel Intensity |
|---|---|---|---|
| Black | 0 | 0 | 0 |
| White | 1.000 | 1.000 | 1.000 |
| Red | 1.000 | 0 | 0 |
| Pink | 1.000 | 0.216 | 0.216 |
| Salmon | 1.000 | 0.552 | 0.552 |
| White | 1.000 | 1.000 | 1.000 |
| Green | 0 | 1.000 | 0 |
| Cyan | 0 | 1.000 | 1.000 |
| Light Cyan | 0.216 | 1.000 | 1.000 |

Figure 16:
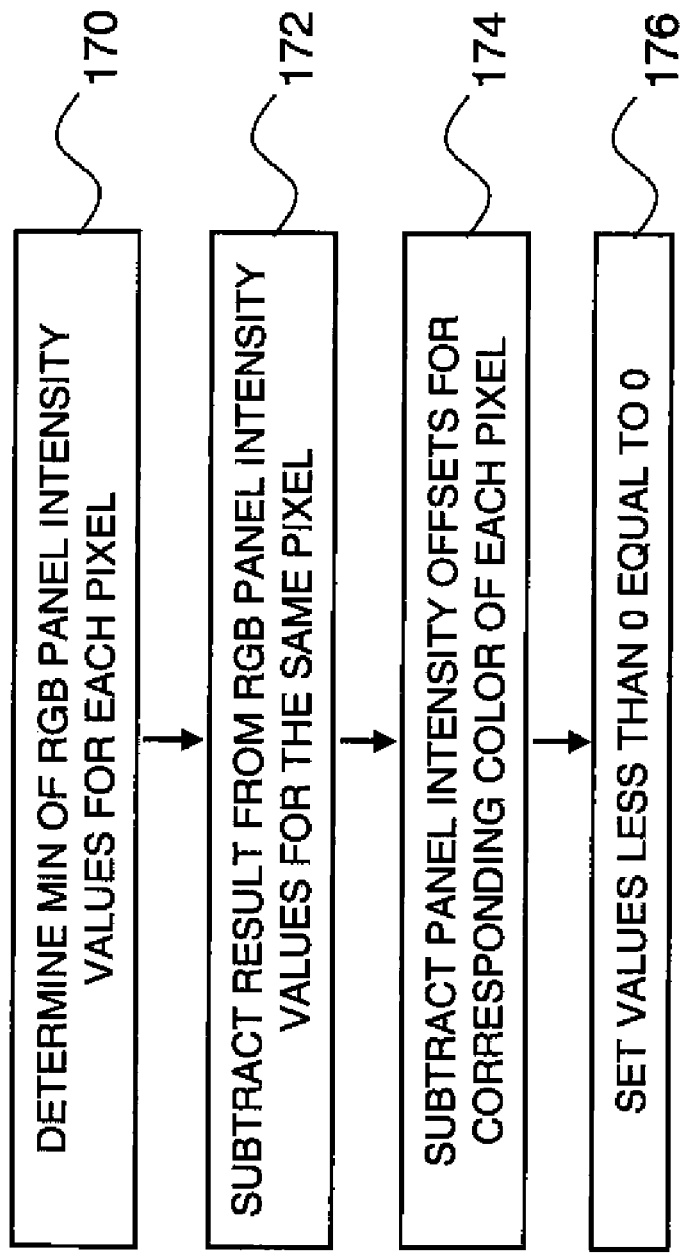
FIG. 16 is a flow diagram of a method for determining a residual difference according to an embodiment of the present invention.

Once the input signal has been acquired (step 105 in FIG. 1), the residual difference is determined 110 for each color component of each pixel signal. The method for determining this residual difference is shown in FIG. 16. As shown, beginning with the red ($R_i$), green ($G_i$), and Blue ($B_i$) panel intensity values for each pixel (i), the minimum of the red, green, and blue panel intensity values (i.e., $\min(R_i, G_i, B_i)$) are determined (Step 170) for every pixel in each image represented by the input signal. This value is then subtracted (Step 172) from each of the panel intensity values for the corresponding pixel, providing values $R_i'$, $G_i'$, and $B_i'$, calculated as:

$$R_i' = R_i - \min(R_i, G_i, B_i)$$

$$G_i' = G_i - \min(R_i, G_i, B_i)$$

$$B_i' = B_i - \min(R_i, G_i, B_i)$$

The resulting value generally represents the panel intensity values that can be used to drive the red, green, and blue sub-pixels for this image within this display system. However, as demonstrated earlier, some of the red, green, or blue channels can have a maximum panel intensity value greater than 1. To compensate for this, the panel intensity offsets ($R_o$, $G_o$, $B_o$) determined in step 160 can be subtracted (Step 174) from the difference between the input panel intensity values and the minimum of the panel intensity value for the corresponding color within each pixel and any resulting values less than 0 can be set (Step 176) to be equal to 0. These operations can be expressed as:

$$R_i'' = R_i' - R_o \text{ for } Ri'' >= 0, 0 \text{ otherwise}$$

$$G_i'' = G_i' - G_o \text{ for } Gi'' >= 0, 0 \text{ otherwise}$$

$$B_i'' = B_i' - B_o \text{ for } Bi'' >= 0, 0 \text{ otherwise}$$

where $R_i''$, $G_i''$, and $B_i''$ represent the resulting values. These resulting values are the residual differences for each sub-pixel within each image. Table 4 shows the minimum panel intensity values as well as the final residual differences after the panel intensity offsets have been subtracted (Step 174).

TABLE 4

Minima and Residual Difference Values.

| Image Color | Minimum | Red Residual Difference | Green Residual Difference | Blue Residual Difference |
|---|---|---|---|---|
| Black | 0 | 0 | 0 | 0 |
| White | 1.000 | 0 | 0 | 0 |
| Red | 0 | 0.879 | 0 | 0 |
| Pink | 0.216 | 0.663 | 0 | 0 |
| Salmon | 0.552 | 0.327 | 0 | 0 |
| White | 1.000 | 0 | 0 | 0 |
| Green | 0 | 0 | 1.000 | 0 |
| Cyan | 0 | 0 | 1.000 | 0.969 |
| Light Cyan | 0.216 | 0 | 0.784 | 0.753 |

The limit value is then determined 115 for each image. Since each of the rows of values shown in Table 4, represent an image of a single color, this limit can be determined by computing the maximum across the columns of red, green and blue residual differences to obtain the values shown in Table 5. It is recognized that most practical images are not formed from a single color but instead include of a mosaic of different code values for each color within each pixel and the limit value represents the limit value for all pixels in the input image signal 30.

TABLE 5

Maximum Residual and Common Scale Factor

| Image Color | Maximum Residual | Common Scale Factor |
|---|---|---|
| Black | 0 | 1.542 |
| White | 0 | 1.542 |
| Red | 0.879 | 1.138 |
| Pink | 0.663 | 1.508 |
| Salmon | 0.327 | 1.542 |
| White | 0 | 1.542 |
| Green | 1.000 | 1.000 |
| Cyan | 1.000 | 1.000 |
| Light Cyan | 0.784 | 1.275 |

The common scale factor is then calculated 120 for each of the color components based upon the limit value. This computation is performed by first computing the inverse of the maximum residual value. Any resulting value that is greater than the maximum common scale factor determined in step 164 is then assigned this maximum common scale factor value. The resulting values for this example are shown in Table 5. As shown, these values range between 1 and 1.542, which is the maximum common scale factor value, and, in this example, the maximum white panel intensity value.

The input-image values, specifically, the panel intensity values shown in Table 3 are then multiplied by the common scale factor. In this way, the common scale factor is applied to the image input signal to produce the image output signal. This results in scaled panel intensity values, as shown in Table 6.

TABLE 6

Scaled Panel Intensity Values.

| Image Color | Red Panel Intensity | Green Panel Intensity | Blue Panel Intensity |
|---|---|---|---|
| Black | 0 | 0 | 0 |
| White | 1.542 | 1.542 | 1.542 |
| Red | 1.138 | 0 | 0 |
| Pink | 1.508 | 0.326 | 0.326 |
| Salmon | 1.542 | 0.851 | 0.851 |
| White | 1.542 | 1.542 | 1.542 |
| Green | 0 | 1.000 | 0 |
| Cyan | 0 | 1.000 | 1.000 |
| Light Cyan | 0.275 | 1.275 | 1.275 |

The panel intensity values are then converted 135 from a three-color input signal to a four-color output signal, specifically to red, green, blue, and white panel intensity values, providing a conversion from a three-color-component image input signal to a four-color-component image signal in which the input signal color components include red, green, and blue and the image output signal color components include red, green, blue and white. This conversion 135 is performed by computing the minimum of the red, green, and blue panel intensity values for each pixel in each image, assigning a portion of this minimum value as the white panel intensity value, and subtracting this same portion of this minimum value from the red, green, and blue panel intensity values. This portion can range from any value larger than zero to one. Assuming the portion is assigned a value of 1, the red, green, blue, and white panel intensity values shown in Table 7 are obtained. As shown, at least one of the red, green, or blue intensity values are zero after this transformation for each of the input colors the luminance for each color will be created by the white sub-pixel within the display of this example. Since this sub-pixel is higher in luminance efficiency than any of the filtered, saturated color sub-pixels, this transformation will result in the highest efficiency conversion.

TABLE 7

RGBW Panel Intensity Values.

| Image Color | Red Panel Intensity | Green Panel Intensity | Blue Panel Intensity | White Panel Intensity |
|---|---|---|---|---|
| Black | 0 | 0 | 0 | 0 |
| White | 0 | 0 | 0 | 1.542 |
| Red | 1.138 | 0 | 0 | 0 |
| Pink | 1.183 | 0 | 0 | 0.326 |
| Salmon | 0.691 | 0 | 0 | 0.851 |
| White | 0 | 0 | 0 | 1.542 |
| Green | 0 | 1.000 | 0 | 0 |
| Cyan | 0 | 1.000 | 1.000 | 0 |
| Light Cyan | 0 | 1.275 | 1.275 | 0.275 |

The image is then converted to a drive signal by performing a lookup within the lookup table depicted in Table 1 to create the drive signal 35, providing this signal to the display 10, and displaying 140 the image.

In this example, the method for determining the residual difference for each pixel signal was the same as was used during the converting step. In another, alternative, embodiment, the converting step can be performed and the red, green, and blue values from this converted signal used as the residual differences for each pixel signal. In such an alternative embodiment, the converted signal is then multiplied by the common scale factor to produce the output signal rather than multiplying the input image signal by the common scale factor to produce the output signal.

To determine the color differences created between an RGB system displaying the input signal and the RGBW display of the present embodiment displaying the converted RGBW signal, CIE 1931 chromaticity coordinates for each system can be computed by multiplying both the RGB Panel Intensity Values of Table 3 and the RGBW Panel Intensity Values of Table 7 by their respective primary matrices. The resulting XYZ tristimulus values can then be converted to the 1931 CIE chromaticity coordinates shown in Table 8. As shown, the chromaticity coordinates (both x and y) for the RGB and RGBW systems are identical. However, most luminance values (denoted by Y) are higher for the RGBW system than for the RGB system. However, when viewing this display as a single-stimulus display, the human visual system will adapt to the white point of the display. In the RGB system, this adapting luminance is always 385 cd/m². However, for the RGBW system, the white point varies as a function of the common scale factor. Resulting white-point luminance values are shown in the column labeled "Adapt Lum". If it is assumed that the human visual system adapts to these luminance values when viewing the resulting images, as would typically occur for the display viewed in a dark room, one can use these values to calculate differences in the L*a*b* values ($\Delta E_{ab}^*$) for the RGB and RGBW systems where the adapting luminance ($Y_n$) for the RGB system is 385 cd/m² for all images and the luminance of the color is designated by Y. As shown, the differences in the L*a*b* values ($\Delta E_{ab}^*$) for the RGB and RGBW systems is calculated using the equation:

$$\Delta E_{ab}^* = [(L_{RGB}^* - L_{RGBW}^*)^2 + (a_{RGB}^* - a_{RGBW}^*)^2 + (b_{RGB}^* - b_{RGBW}^*)^2]^{0.5},$$

and L*, a*, and b* for each system is calculated from the equations:

$$L^* = 116\left(\frac{Y}{Y_n}\right)^{\frac{1}{3}} - 16,$$

$$a^* = 500\left[\left(\frac{X}{X_n}\right)^{\frac{1}{3}} - \left(\frac{Y}{Y_n}\right)^{\frac{1}{3}}\right],$$

$$b^* = 200\left[\left(\frac{Y}{Y_n}\right)^{\frac{1}{3}} - \left(\frac{Z}{Z_n}\right)^{\frac{1}{3}}\right],$$

and X and Z are calculated from:

$$X = \left(\frac{x}{y}\right)Y, \text{ and}$$

$$Z = \left(\frac{(1-(x+y))}{y}\right)Y.$$

The resulting calculations show that the difference between L*a*b* values for the RGB and RGBW systems is zero, indicating that no color error is present within the rendering path. Since the resulting errors are less than 3, which is typically required to detect a color difference in a complex image, no color error is present. Therefore, this system produces a display with a higher average luminance value as can be seen by comparing the RGBW Y and RGB Y columns in Table 8, without introducing color error.

TABLE 8

Rendered Values for RGB and RGBW Systems

| Image Color | RGB x | RGB y | RGB Y | RGBW x | RGBW y | RGBW Y | Adapt Lum |
|---|---|---|---|---|---|---|---|
| Black | 0.3127 | 0.3290 | 0 | 0.3127 | 0.3290 | 0 | 594 |
| White | 0.3127 | 0.3290 | 385 | 0.3127 | 0.3290 | 594 | 594 |
| Red | 0.6400 | 0.3300 | 82 | 0.6400 | 0.3300 | 93 | 438 |
| Pink | 0.4551 | 0.3294 | 147 | 0.4551 | 0.3294 | 222 | 581 |
| Salmon | 0.3607 | 0.3291 | 249 | 0.3607 | 0.3291 | 384 | 594 |
| White | 0.3127 | 0.329 | 385 | 0.3127 | 0.329 | 594 | 594 |
| Green | 0.3000 | 0.6000 | 275 | 0.3000 | 0.6000 | 275 | 385 |
| Cyan | 0.2246 | 0.3287 | 303 | 0.2246 | 0.3287 | 303 | 385 |
| Light Cyan | 0.2474 | 0.3288 | 321 | 0.2474 | 0.3288 | 409 | 491 |

The particular embodiment as provided performs very well when displaying one or a series of still images, each of which is viewed for a period of time before displaying another still image. However, when displaying video content, which depicts relatively small changes in a scene, such as occurs when panning a scene, placing an object in motion in a scene, or gradually changing lighting within a scene, each frame in an input sequence has the potential to have a different distribution of pixel values if the common scale factor is calculated independently for each frame. If the common scale factor is calculated 120 as provided in this embodiment for each frame and used to scale the image 130 represented by each video frame, some undesirable artifacts can occur. Specifically, when viewing a single scene in which most objects are not changing, the user can see the luminance of the image change as each frame is displayed due to changes in the luminance of one or a small number of objects within the scene. This change in luminance can be distracting and disruptive to the viewing experience. Hence, when displaying video, it is desirable to avoid applying large changes in the common scale factor to subsequent images within a single scene of a video. Therefore, changes in the common scale factor can be limited over time, or the common scale factor can be smoothed, to eliminate perceptible changes in luminance. However, this will not always produce the best results, as the luminance of the scene can only be changed gradually. Instead, it has been observed that both a fast and slow method for adjusting the luminance of the scene is necessary when processing video. The fast change is provided at times of dramatic changes in the video, typically indicating scene changes and the slow change is provided at other times, typically within a scene. The selection between large or small changes in the common scale factor is facilitated in one embodiment by an analysis of the differences between scenes, with larger changes only permitted at scene cuts or other very dramatic changes within the video content. In one embodiment, the common scale factor can be smoothed over time and a final common scale factor can be selected from the smoothed common scale factor, the original common scale factor, or some average of these two values, based upon some method for detecting the magnitude of image difference between subsequent frames within a video signal.

When discussing video, it is useful to describe a video scene as more than one individual frame or image that depicts similar spatial and temporal information. That is, a scene can consist of all frames, each of which can be described as an image, which contain overlapping spatial information that is captured or represented within a time interval of a few minutes. A scene change occurs when the viewpoint of the camera used to capture the video scene changes dramatically or whenever capturing of the same spatial location stops for a period of minutes and then begins again. It should be noted, that large changes of the scale factor that is applied to scale 130 an image when displaying subsequent frames within a scene can be objectionable. However, very large changes in the scale factor that is applied to scale 130 an image as the video transitions from one scene to another scene is typically undetectable by the user as the user expects to adapt to the luminance of the new scene.

Figure 5:
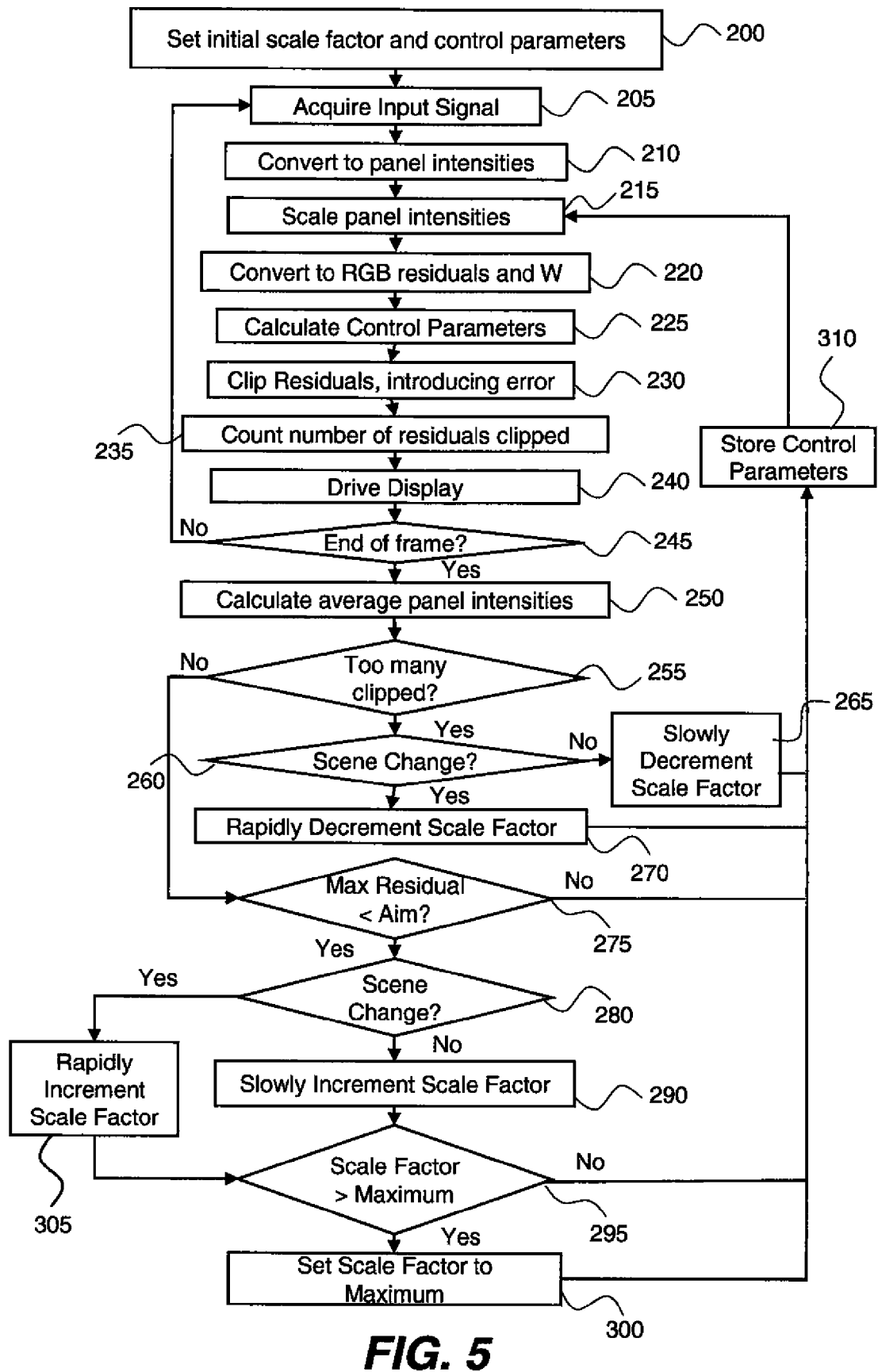
FIG. 5 is a flow diagram according to an embodiment of the method of the present invention that is useful for providing the present invention in a real-time system.

In a second embodiment designed specifically for processing video, the method in FIG. 5 can be applied. As shown in this figure, a method of converting a three-or-more-color-component image input signal to an image output signal that is suitable for a four-color display device is provided. This method includes acquiring 205 an input signal including a plurality of pixel signals, each input pixel signal having three, or more, color components, setting an adjustable common scale factor for adjusting the input signal 200, determining 230 residual errors representing the inability of the display to provide a proper color representation 220, adjusting the common scale factor 265, 270, 290, 305 based upon the residual errors; and applying 215 the common scale factor to the image input signal, scaling the image input signal to produce the image output signal.

In the detailed embodiment of FIG. 5, the display 10 will also be provided and the characteristics of this display can be used to obtain display operating characteristics as well as to set 200 an initial common scale factor and some initial control parameters. Among the characteristics of the display are the CIE 1931 x,y chromaticity coordinates of the red 20R, green 20B, blue 20B and white 20W sub-pixels; a display white point; red, green, blue, and white tone scales; panel intensity offsets; and the maximum common scale factor as determined in the earlier embodiment. For purposes of simplification, this example will assume the use of the same display and characteristics as the prior example. Additionally, an initial common scale factor will be assumed to be 1, values for average scene luminance and maximum residuals will be assumed to be 0.5, the number of permitted pixels to clip will be assumed to be equal to 0, and the aim residual will be assumed to be 0.95.

It should be noted that to clip a signal is to set an artificial limit on the signal, which is less than the value would otherwise have been assigned. In imaging systems, such clipping, if performed on a large number of pixels can produce imaging artifacts, such as loss of visual detail or contouring in the resulting image. However, by clipping only small numbers of pixels, such artifacts are typically not readily apparent to the casual observer.

Each of these parameters will be applied within this example. The exact values of these parameters are not important but they establish a set of initial conditions that can be updated constantly by the process to make important decisions about the common scale factor.

A three-or-more-color input signal can then be acquired 205. As in the previous example, this signal will be an sRGB signal and will contain nine video frames, the code values of which are provided in Table 2. It will be assumed that these 9 colors actually represent 9 frames within a video sequence, wherein each frame is made up of an array of pixels of data but every pixel within each frame is defined by the sRGB code values shown in Table 2. In this condition, however, each pixel, as defined by a red, green, and blue code value, and each frame of this video will be assumed to be sequentially input to the controller 25. In such a real-time video system, it is undesirable to have frame buffers for storing one or more of the video frames before displaying this video frame. Therefore, it is desirable to receive each or a sequence of a few pixels of the input signal, process and display these pixels without delay.

As in the previous embodiment, the input signal is then converted 210 to panel intensity values. This conversion process was described previously and results in the panel intensity values shown in Table 3 for each of the nine frames of video. However, as indicated above, this conversion is preferably performed in real time, with each pixel being converted before a subsequent pixel is received.

As these input signals are converted 210 to red, green, and blue panel intensity values, they are scaled 215 by multiplying each of the red, green, and blue panel intensity values by the common scale factor. As noted earlier, this common scale factor has an initial value of 1 and therefore, this transformation has no practical effect on the first frame of video that is displayed as this same common scale factor can be applied to an entire frame of the input three-component image signal. However, as will be shown, the common scale factor can be adjusted for each frame and therefore, for each of the subsequent frames of input three-component image signal values, this scale factor can be greater than 1 for at least some of the future frames and produce scaled red, green, and blue panel intensity values that are greater than 1. These values can, therefore, require the display to produce luminance values higher than the combination RGB white-point luminance. Note also that while panel intensity values are indicated as within the range of 0 to 1, these values are typically stored as a 10- or 12-bit integer value. If this is performed in a 10-bit system, integer values between 0 and 1024 are used to indicate values between 0 and 1. To indicate larger values, the result of this scaling will typically require at least one additional bit and in this example, adding an $11^{th}$ bit, can permit the use of integer values between 0 and 2048, indicating intensity values between 0 and 2.

The scaled red, green, and blue panel intensity values can then be converted 220 to red, green, and blue residual values and white panel intensity values. This conversion can be performed by first determining the minimum of the scaled red, green, and blue panel intensity values for each pixel. This minimum value can be subtracted from the scaled red, green, and blue panel intensity values to produce red, green, and blue residual values. This same minimum value can be assigned as the white panel intensity value. Through this step, the three-or-more-color component input image signal is converted to a signal that includes at least one additional color component image signal suitable for driving a display device having four or more differently colored sub-pixels.

Control parameters are then calculated 225 within this embodiment. These control parameters include the maximum of the red, green, and blue residual values for a frame of the three-component image signal and the average red, green, and blue residual values for a frame of the input three-component image signal. For common scale factors greater than 1, the maximum red, green, and blue residual values for any frame can be greater than 1 plus the panel intensity offset for the appropriate color, in which case the red, green, and blue residual values greater than 1 plus the panel intensity offset for the appropriate color can be clipped 230 to a value of 1 plus the panel intensity offsets for the appropriate color. This clipping 230 can introduce color error into one frame of video signal, which is undesirable within some applications. Therefore, it is important to understand when this condition exists and to rapidly lower the common scale factor such that this color error is not present, not perceptible, or not measurable when the display is used within these applications. One additional control parameter is also determined by counting 235 the number of red, green, and blue residual values that are clipped 230. Notice that it is not necessary that the magnitude of the color error be determined, only that some color error is introduced, or that it is introduced into some number of the residual values. However, the magnitude of the residual errors can be determined by calculating a residual difference between each color component of each pixel signal and the color component limit for each pixel signal and subtracting a maximum signal from the residual difference for each color component of each pixel signal and setting all negative values equal to zero. In this example, this maximum signal value is the maximum red, green, or blue panel intensity value within any image or frame of the video.

As the controller receives the three-or-more-color-component input signal values and converts it to clipped red, green, and blue residual values and white panel intensity values, these intensity values are applied to drive the display 240. This step includes looking up code values based upon input panel intensity values using tables, such as shown in Table 1 and providing these code values as the drive signal 35 to the display 10 to drive the red 20R, green 20G, blue 20B, and white 20W sub-pixels. This process is provided in real time, without buffering image information.

Once a frame of data has been provided to drive 240 the display 10, it is determined 245 that the end of a frame has been displayed. During the time allocated for display retrace (i.e., the time between video frames allocated for a CRT beam to move from the bottom right to the top left within most existing video standards), the control parameters are analyzed to determine if and how to modify the common scale factor before displaying the next frame of three-or-more-color-component input signal values. This analysis can include calculating 250 the average panel intensities. The number of residual values that were clipped is then compared 255 to the required number of residual values permitted to clip.

It should be noted that this required number will typically be set as a constant by the system designer and stored in firmware. While a value of zero can result in images with no color error, small numbers on the order of a few percent can result in images where a maximum of a few percent of the pixels have some small color error, which is typically not noticeable. Depending upon the application, different user groups can have different tolerances for this value, however, it will typically be a value less than 10 percent of the number of sub-pixels in the display.

If the number of red, green, and blue residual values that are clipped exceeds the required number, then the common scale factor must be reduced for the subsequent frame to reduce the number of red, green, and blue residual values that are clipped. To reduce the common scale factor, an analysis is first performed to determine 260 if this error has been caused by a scene change, which now requires a substantially different common scale factor. In the current embodiment, this decision is made based upon the comparison of the calculated average panel intensity value with the previously calculated average panel intensity value, as well as a comparison of the maximum red, green, or blue residual value with the maximum red, green, or blue residual value from the previous frame. If both of these differences are small enough, then no scene change is presumed to have occurred. In this case, the common scale factor is decremented 265 by a small amount, which permits the white point luminance of the display to be reduced by a few percent (around 5 percent) per second. Under these conditions, the image is dimmed at a slow enough rate that a viewer cannot see the change in luminance and the image does not appear to suddenly dim or flicker. If both the change in the average and maximum red, green, and blue residual values is large enough, then a scene change is determined 260 to have occurred. As an example of the magnitude of change required for the average and maxima, a scene can be categorized as changing anytime the average scene luminance changes by 12.5% of the entire range and anytime the maxima change by 25% of the entire range. Under these conditions, the common scale factor is recomputed, permitting it to decrement 270 rapidly. This computation includes multiplying the common scale factor by the ratio of the maximum value for the red, green, and blue residual values (e.g., 1 plus the panel intensity offsets for the appropriate color) to the maximum of red, green and blue residual value. This computation produces a lower scale value, which avoids substantial clipping for the subsequent frame. It should be noted that the change in luminance that results from this potentially rapid change in scale value is not perceptible to the user since the content has changed significantly with changes in scene and therefore the user does not have any expectation for the brightness of the current scene.

If it is determined 255 that not too many of the red, green, and blue residual values have been clipped, then the maximum red, green, and blue residual value is compared 275 to an aim maximum, which is a value slightly less than 1 (e.g., 0.95). If the maximum residual value is greater than this aim maximum, then the common scale factor is deemed to be near optimal and it remains unchanged. However, if the maximum residual value is less than this aim maximum residual value, the scale factor is increased to permit the image to be displayed at higher luminance in the next frame. Once again, it is determined 280 if a scene change has occurred. If not, then the scale value is incremented 290 by a few percent per second, similar to the slow decrement 265 when the scale value was decreased. If a scene change was determined to have occurred during comparison 280, the scale value is calculated and incremented 305. The calculation includes determining the ratio of the maximum value for the red, green, and blue residual values (e.g., 1 plus the panel intensity offsets for the appropriate color) to the maximum of red, green and blue residual value. This calculation can produce a rapid change in the scale factor but again only after a scene change has not established a user expectation for the scene brightness. Regardless of the increment that is determined in steps 290 or 305, the resulting common scale factor is compared 295 to the maximum scale factor. This maximum scale factor is determined by dividing the maximum luminance of the white sub-pixel by the combination RGB white-point luminance. If the common scale factor is less than this maximum scale factor, the common scale factor is applied; otherwise it is set 300 equal to the maximum scale factor.

Before receiving input image signals for the next video frame, the control parameters are stored 310 to provide comparison values when analyzing the subsequent frame. This includes saving the maximum red, green, and blue residual values and the average residual value. However, to avoid certain unwanted temporal effects, such as flicker, the average residual value can be calculated as a weighted average with historic values. That is, the average residual value for comparison during the next frame can be calculated by adding 20% of the old average residual value to 80% of the new average residual value. This time average smoothes changes in this value, reducing the likelihood of flicker or other artifacts if subsequent frames alternate between higher and lower average input three-component image value signals.

Once the display retrace has completed and the scale factor has been determined in steps 265, 270, 295 or 300, the process begins again for the next frame of data. However, the panel intensities are scaled 215 using the new common scale factor. As such, the luminance of the current image is scaled to higher or lower values than the previous image. By adjusting the common scale factor as described, images without very bright, saturated colors can be rendered with common scale factors that are substantially higher than 1 as demonstrated in the previous embodiment, permitting these images to be rendered with high luminance without introducing any color errors. However, images containing very bright, saturated colors can have high residual values and therefore can be rendered with scale values equal to or very near 1 and can be rendered at lower peak luminance but can once again be rendered without color error. This processing, assuming no red, green, or blue residual values are to be clipped, permits images to be presented without any color error while permitting the input three-component color image signal to be rendered at a higher average luminance than methods of the prior art which do not render the input three-component color image signal without color error, such as desaturation. Further, since the common scale factor is applied to an entire frame of image data it does not change the relative luminance ratios within the scene, as some methods of the prior art, which produce color errors. As was noted, the current embodiment can introduce some color error by clipping 230 residual values. However, under conditions in which none of the residuals are to be clipped, the scale value is reduced to eliminate clipped values, typically within a few frames. Since these video frames are provided at rates typically between 30 and 60 frames per second, color error within a single or even a few initial frames can not be detectable by a user of the display.

Applying this embodiment of the present invention to the images of Table 2, provides the common scale factor and calculation parameters shown in Table 9. As shown in this table, the common scale factor is typically greater than 1, once again permitting the luminance of the resulting images to be rendered at a higher luminance than prior-art methods that did not generate color error. For the images that are shown, the scene detector nearly always classifies the changes between images as a change in scene. The exceptions are the transition from salmon to white and green to cyan; in each of these cases the change was relatively small and the change in common scale factor was either small or non-existent. Comparing the common scale factor results in Table 9 with those provided in Table 5, one can see that changes in the common scale factor for this embodiment tend to trail the change in image content by a frame, since the image data can be processed and displayed while the common scale factor is changed within the display retrace interval. While this can appear to be a problem for this set of images, this is not a problem with a more traditional video sequence as any two frames within a single scene tend to be very similar to one another and each frame is displayed for so short a period of time that it is imperceptible to the user. Therefore, this time delay is perfectly acceptable within a video display. However, the use of scene detection to permit both rapid and slow changes in the scale factor is certainly useful and can be necessary to achieve high-quality video without temporal artifacts.

TABLE 9

Parameters and calculated scale factor for images of Table 2

| Image Color | Max Residual | Old Average Residual | Average Residual | Clipped | Change | Scale Factor |
| --- | --- | --- | --- | --- | --- | --- |
| Black | 0 | 0.50 | 0 | No | | 1.00 |
| White | 0 | 0.10 | 0 | No | Large Inc | 1.54 |
| Red | 1.54 | 0.02 | 0.514 | Yes | Unchanged | 1.54 |
| Pink | 0.85 | 0.42 | 0.284 | No | Large Dec | 1.09 |
| Salmon | 0.61 | 0.31 | 0.205 | No | Large Inc | 1.37 |
| White | 0 | 0.23 | 0 | No | Small Inc | 1.40 |
| Green | 1.54 | 0.05 | 0.514 | Yes | Large Inc | 1.54 |
| Cyan | 1.00 | 0.42 | 0.667 | No | Large Dec | 1.00 |
| Light Cyan | 0.78 | 0.62 | 0.523 | No | Unchanged | 1.00 |

Figure 6:
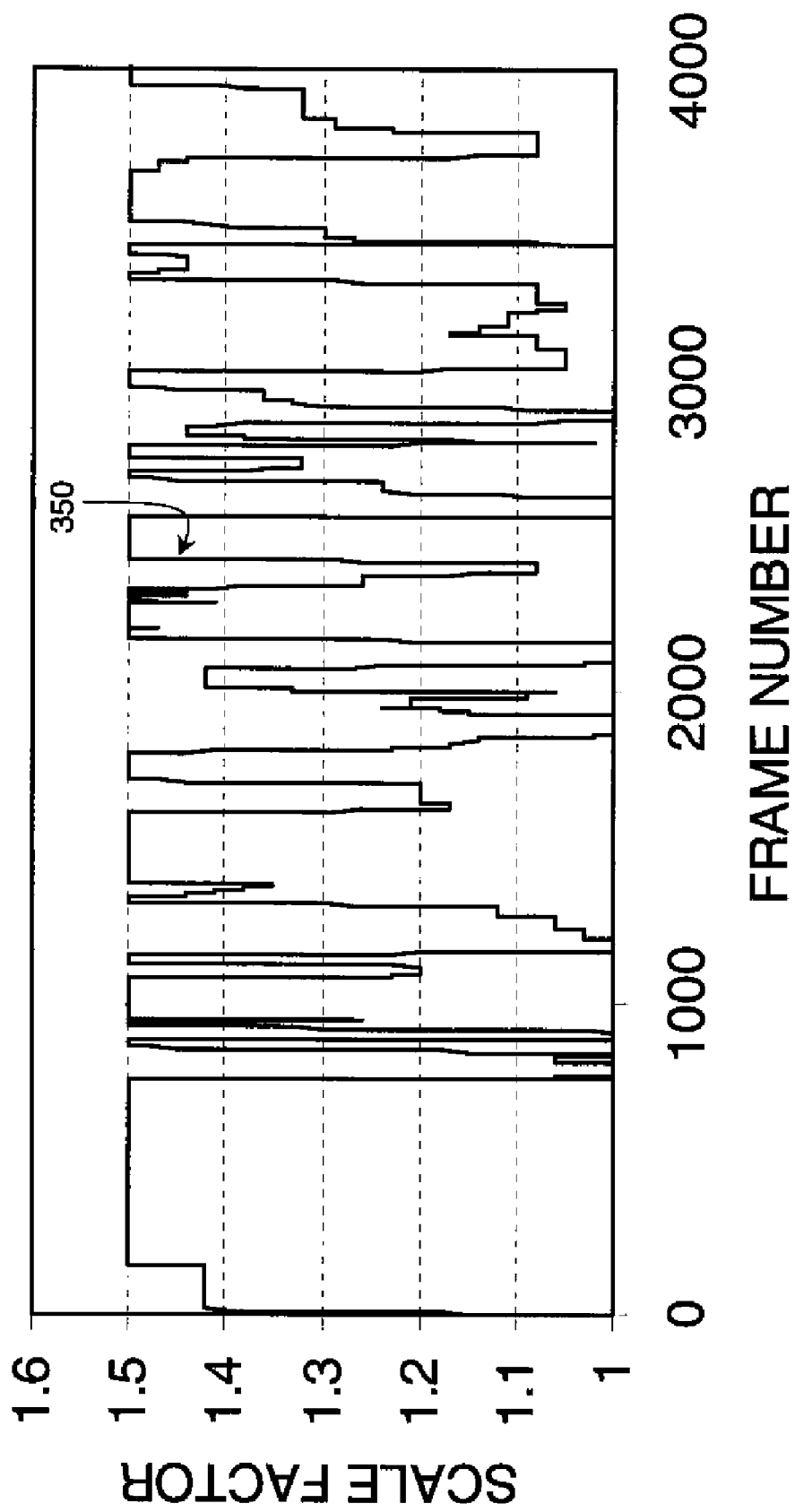
FIG. 6 is a graph illustrating changes in common scale factor for a standard video input when applying the method of FIG. 5 to achieve conversion without color error.

This embodiment was programmed and run against a standard video sequence provided as part of The International Electro-technical Commission (IEC) 62087, Ed. 2 for standard for television power measurement and is intended to represent typical television content. When executed on this content with the assumption that no color error was acceptable, the average scale factor was 1.38. FIG. 6 shows the scale factor 350 plotted as a function of the first 4000 frames within this video. As shown, the scale factor varied between 1 and a maximum scale factor of 1.5 for these first 4000 frames of the video. Relatively rapid changes did occur at scene cuts, otherwise the scale factor often remained constant for large numbers of frames.

Figure 7:
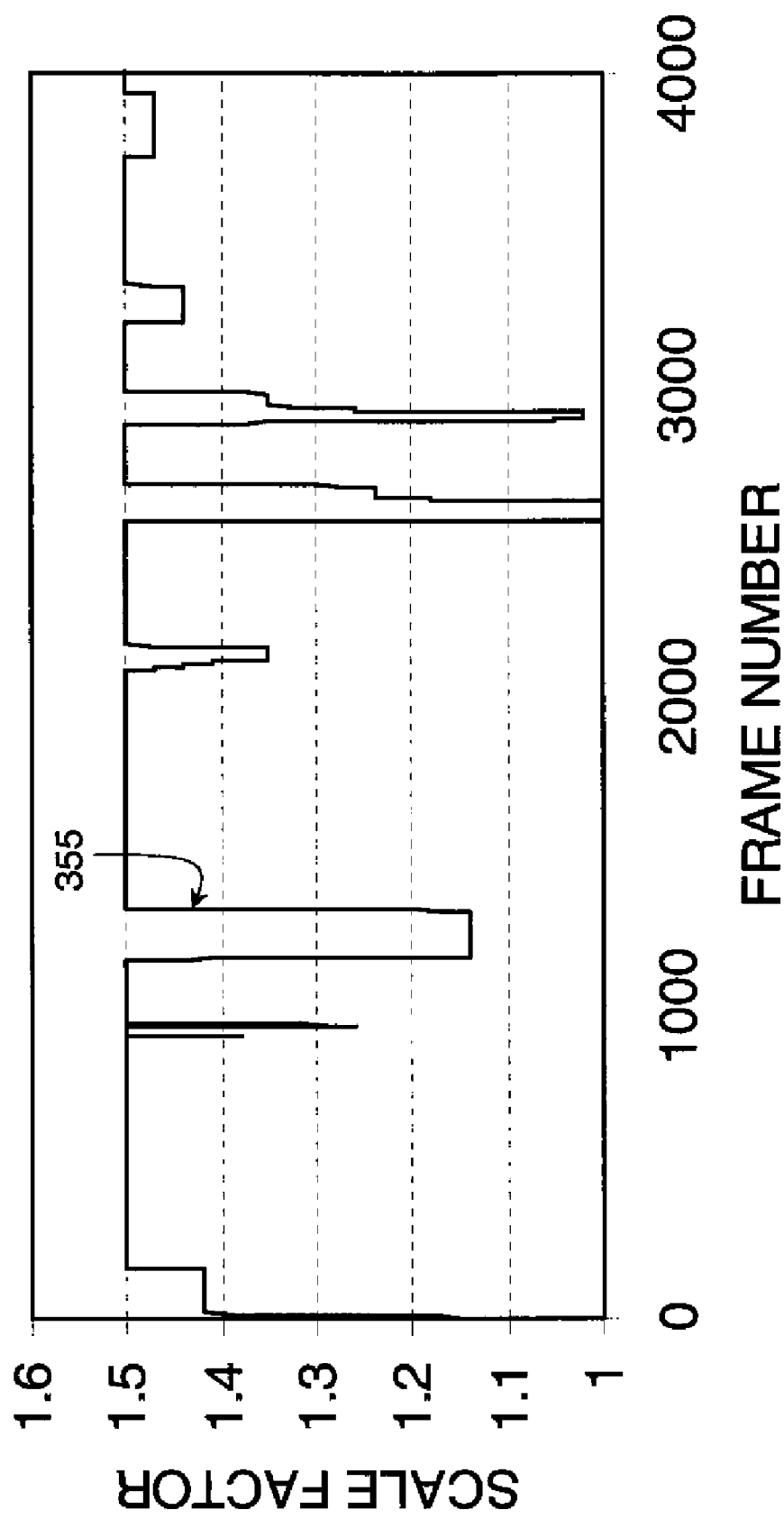
FIG. 7 is a graph illustrating changes in common scale factor for a standard video input when applying the method of FIG. 5 to achieve conversion with color error in 5% or less of a four-color-component output image signal.

Although, it is often desirable that no color errors occur when presenting images, users often cannot detect color error if it is only present in a few percent of the pixels within any image. It has been observed that color error can be tolerable as long as it occurs for fewer than about 10 percent of the pixels in an image. This same algorithm was executed against the IEC standard content while permitting color error to be present in up to 5 percent of the pixels in any image. By implementing this change, the average scale factor increased from 1.38 to 1.47 out of a maximum value of 1.5. That is, if only a few percent of the pixels are clipped, practically all of the images in the IEC standard video can be rendered with a scale factor near the maximum. FIG. 7 shows the scale factor 355 plotted as a function of frame number for the same 4000 frames that were shown in FIG. 6. As shown in this figure, the common scale factor is at or near 1.5 for the majority of frames if the color of only 5 percent of the pixels is clipped. However, for some scenes, lower scale factors are still necessary to avoid color error within larger image regions.

A model of OLED power and lifetime was used to understand the power consumption and lifetime characteristics of an OLED similar to the one described earlier when this algorithm is applied versus an algorithm similar to the one described by Murdoch et al. is applied to render the images in this IEC standard video, with the peak white luminance for the two displays calibrated to be equal. The algorithm of the present embodiment was applied both to render the images with no permitted clipped pixels and with up to 5 percent of the pixels in any frame clipped. The results are shown in Table 10. As shown, at the same peak luminance, a 32-inch OLED television applying the algorithm of the present invention would have an average power that was 10-15% lower, require 33% lower peak power and have a lifetime that was 70-80% longer than the same OLED display applying the prior-art method for driving an OLED display with no color error.

TABLE 10

Performance parameters for OLED display with Inventive Algorithm

| Performance Measure | Prior-Art Method | Inventive Method with No Clipping | Inventive Method with 5% Clipping |
|---|---|---|---|
| Average Power (W) | 72 | 61 | 66 |
| Peak Power (W) | 959 | 643 | 688 |
| Lifetime (1000 s of hours) | 52 | 85 | 75 |

In each of these examples, a maximum common scale factor of about 1.5 has been applied, which has been selected based upon the ratio of the maximum luminance of the white sub-pixels to the combined maximum luminance of the red, green, and blue sub-pixels in the display that produces the desired white point. Within OLED implementations, it is highly desirable for the maximum common scale factor to be set at or below the ratio of the maximum luminance of the white sub-pixels to the combined maximum luminance of the red, green, and blue sub-pixels as this constraint permits a very large percentage of the luminance to be produced by the white sub-pixels which, when employing a white OLED with red, green, blue and white color filters, can always be much more power efficient than the red, green, and blue sub-pixels. However, this is not required and, in fact, it is only necessary that the combination of the luminance output of the red, green, blue, and white sub-pixels be higher than the combined luminance output of the red, green, and blue sub-pixels for the method of the present invention to be useful.

The method can be usefully employed with any maximum common scale factor that is greater than 1. However, as the common scale factor becomes larger, the difference in luminance between the images rendered with a scale factor of 1 and the maximum scale factor become more and more noticeable. Further, if the maximum common scale factor is very close to 1, the method can provide little benefit. Therefore, in advantageous embodiments of the present invention, the maximum common scale factor will be between 1.2 and 2.5 and in even more advantageous embodiments, the maximum common scale factor will be between 1.4 and 2.0.

It will further be recognized that this same method can be designed and applied to have common scale factors less than 1. That is, the default image processing path can be designed to render images at the maximum luminance that can be provided by the one-or-more-additional light-emitting elements and the algorithm can then be designed to apply a common scale factor less than 1 whenever the image contains bright, highly saturated colors that the display is incapable of presenting. In such a system, the minimum scale factor will generally be between 0.5 and 0.75.

Figure 8:
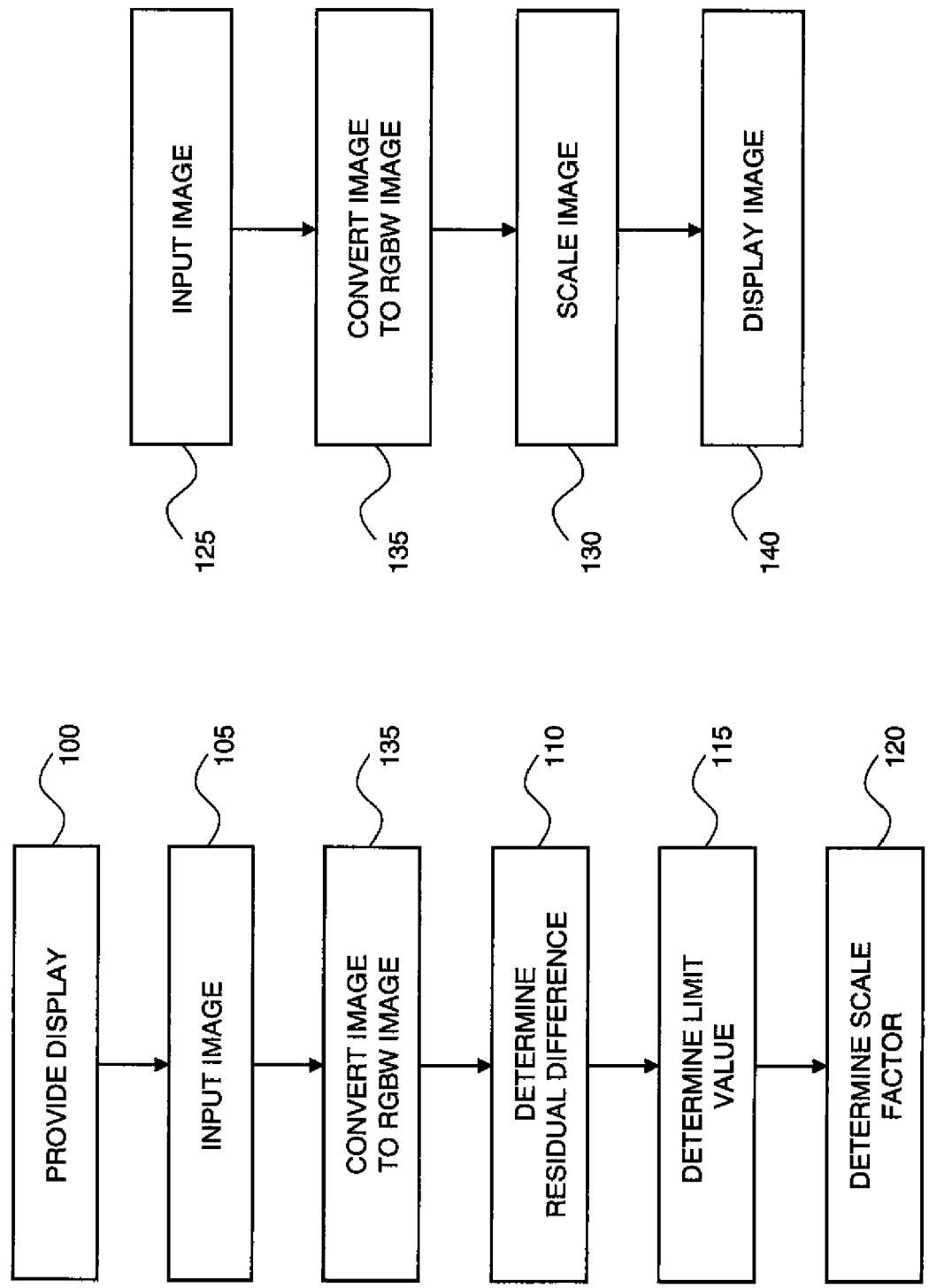
FIG. 8A and FIG. 8B are flow diagrams according to an embodiment of the method of the present invention.
Figure 9:
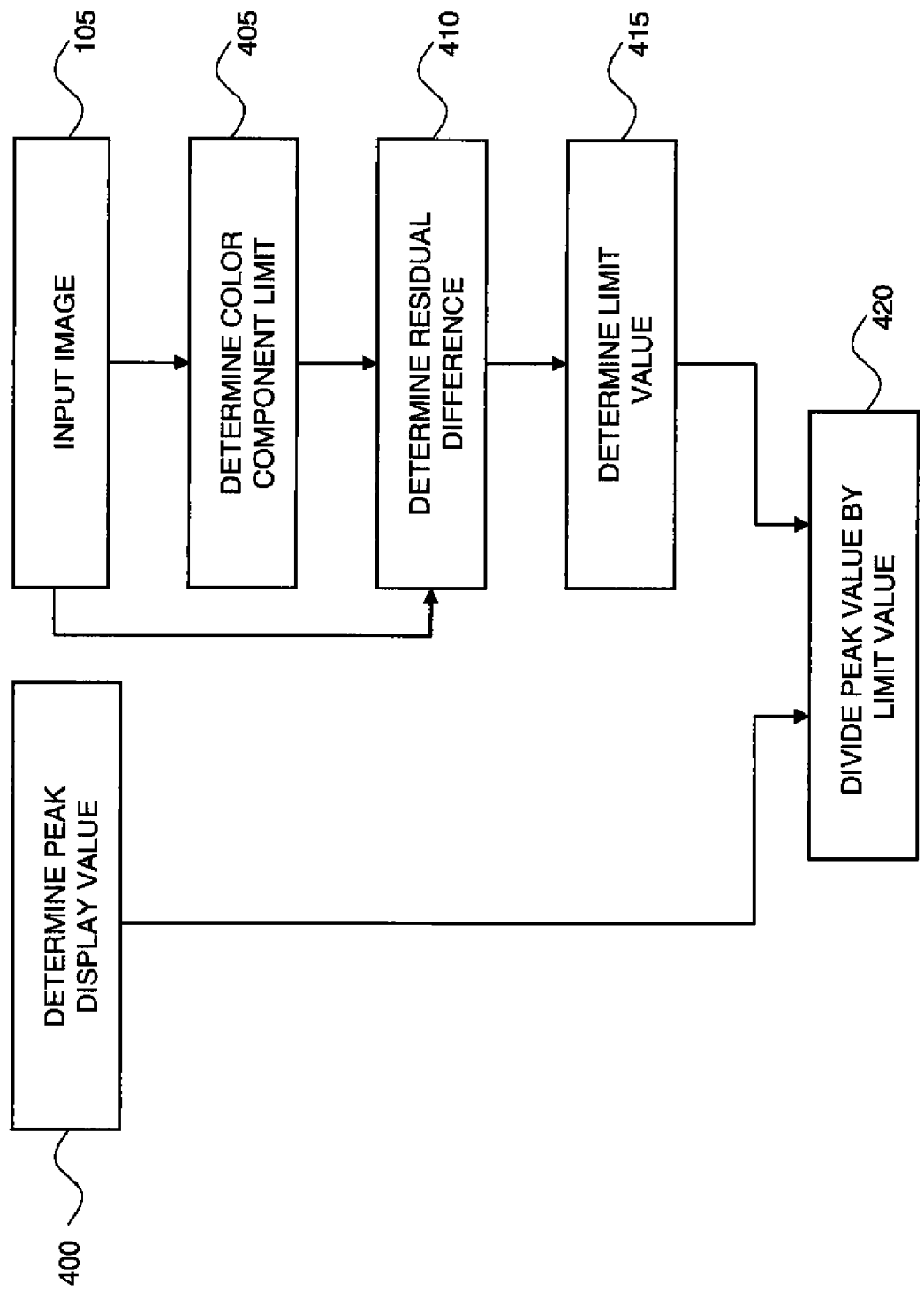
FIG. 9 is a flow diagram according to an embodiment of a portion of the method of the present invention.

In other embodiments of the present invention, if the input signal is a three-color-component signal, the input signal can be converted 135 to a four-color-component image signal before the residual differences are computed as shown in FIG. 8A or before the common scale factor is applied FIG. 8B. Further, the common scale factor can be applied to a three-or-more-color-component image input signal to scale 130 the image after the residuals are computed 110 as shown in FIG. 1B, to the three-or-more-color-component image input signal to scale 215 the signal before the residuals are computed 220 as shown in FIG. 5, or the three-or-more-color-component image input signal can be converted 135 and the four or more color signal can be scaled 130 as shown in FIG. 8B. Referring to FIG. 9, the residual differences can be determined by calculating the difference 410 between each color-component signal for each color and the color-component limit 405 of that signal value for either three- or four-component image input signals. The limit value is then determined 415 and the common scale factor is determined by dividing 420 a predetermined 400 peak display value by the limit value. If the limit value for pixels in the image are at their limit value, or at least greater than or equal to the maximum residual aim, the limit value can be zero and the common scale factor can be set to the value of 1 so that no change is seen between the input and output signals. If the input signal is not at maximum saturation, the limit value is greater than zero and the common scale factor greater than one so that the output signal has a greater luminance than the input signal. Moreover, as discussed previously, because the scale factor is commonly applied and has a limit value limited by the peak display value, the output signal will have no color errors.

In various embodiments of the present invention, the image input signal color components include red, green, and blue or the image output signal color components include red, green, blue and white. The display device can also be a four-color-component display having red, green, blue, and white sub-pixels. Alternatively, an additional color sub-pixel can be employed in the place of, or in addition to, the white sub-pixel, for example yellow, cyan, or magenta sub-pixels can be included.

While the present invention can be usefully applied to still images and a frame-buffer employed in a controller to aid in the computation of the common scale factor, in other embodiments a sequence of images of the same scene can be employed. In such a case, the common scale factor can be adjusted over time to prevent abrupt, user-perceptible changes in luminance from occurring. As shown earlier, when applying the present invention to sequences of images, a frame buffer can be avoided. However, a frame buffer can be employed and the common scale factor can be computed for a single image or a frame within the sequence of images and applied to the same image.

Figure 10:
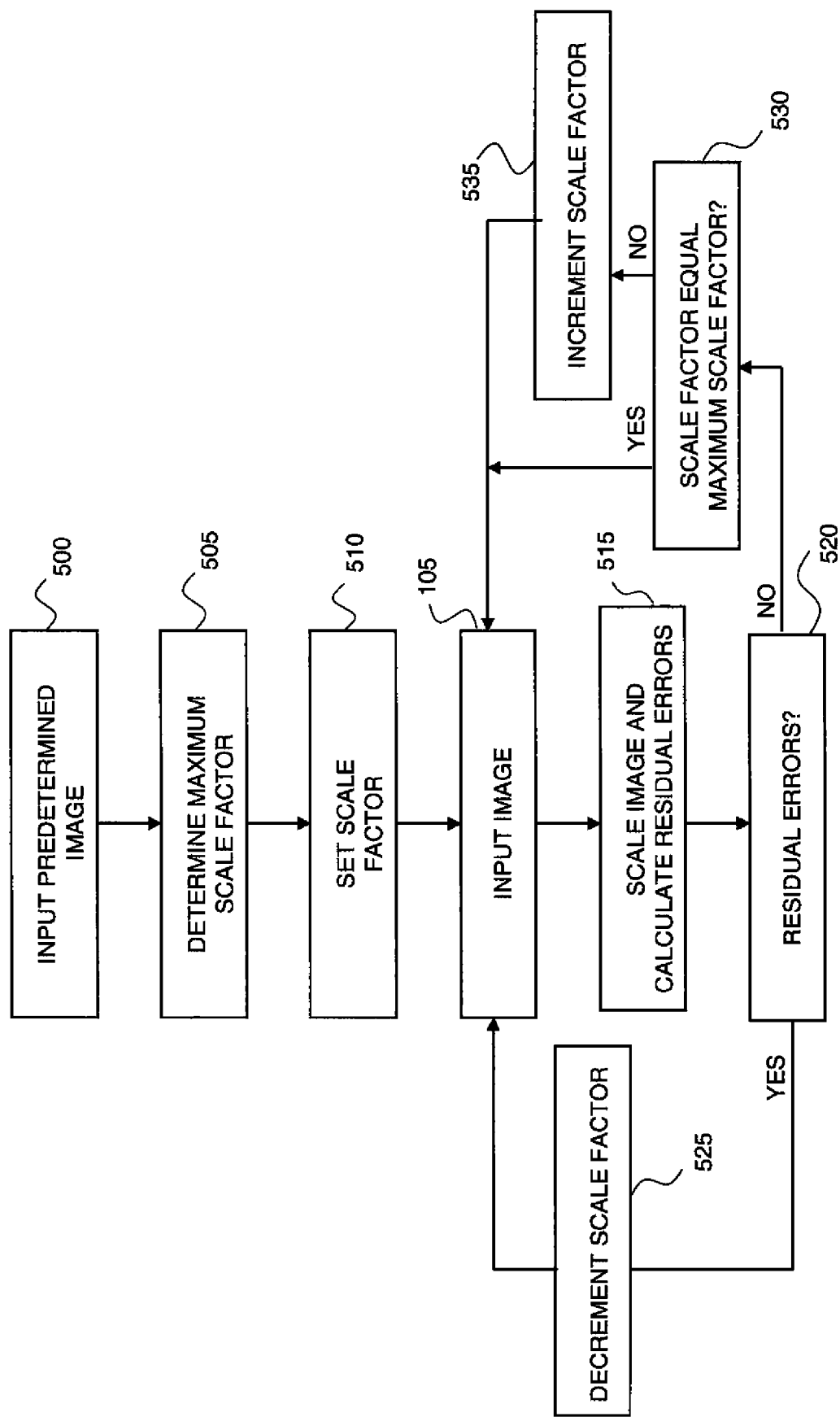
FIG. 10 is a flow diagram according to an embodiment of a portion of the method of the present invention.

Referring to FIG. 10, a method of converting a three-or-more-color-component image input signal to an image output signal that is suitable for a display device includes the steps of acquiring 500 an image input signal comprising a plurality of pixel signals, each pixel signal having three, or more, color components. A maximum common scale factor can be determined 505 using, for example, either the first image of the sequence or a pre-determined representative input signal. An initial, adjustable, common scale factor for adjusting the input signal can be selected 510, and an image signal for display input 105. The image input signal is then scaled and residual errors representing the inability of the display to provide a proper color representation determined 515. In the case where the adjustable common scale factor is too large, residual errors will occur. If the adjustable common scale factor is too small, no residual errors will occur. The count of residual errors is tested 520. If an unacceptable number of residual errors are present, the adjustable common scale factor is decremented 525. If the number of residual errors is zero or acceptable, the scale factor can be compared 530 to the maximum scale factor and incremented 535 if it is too small. The scaled image signal can be displayed after scaling or after the adjustable scale factor is no longer changing.

By employing this inventive method, an image input signal (e.g. a video sequence) can be gradually adjusted until it is at the preferred brightness so that a viewer of a display on which the scaled image is displayed will not notice abrupt changes in luminance or saturation.

The residual errors can be determined by first calculating a residual difference between each input pixel value and the color component limit of that pixel value and computing the limit value (as shown in FIG. 9). The limit value is then multiplied by the adjustable common scale factor to calculate a new common scale factor. Each pixel is then multiplied by the new common scale factor and each multiplied pixel is then compared to a peak display value. The adjustable common scale factor can be determined by dividing a peak display value by the limit value between each input pixel value and the color component limit of that pixel value. A maximum scale factor can be determined from a predetermined input signal, the maximum scale factor having a maximum luminance equal to the maximum luminance of the white sub-pixel divided by the combination RGB white-point luminance, for an RGBW display.

Figure 11:
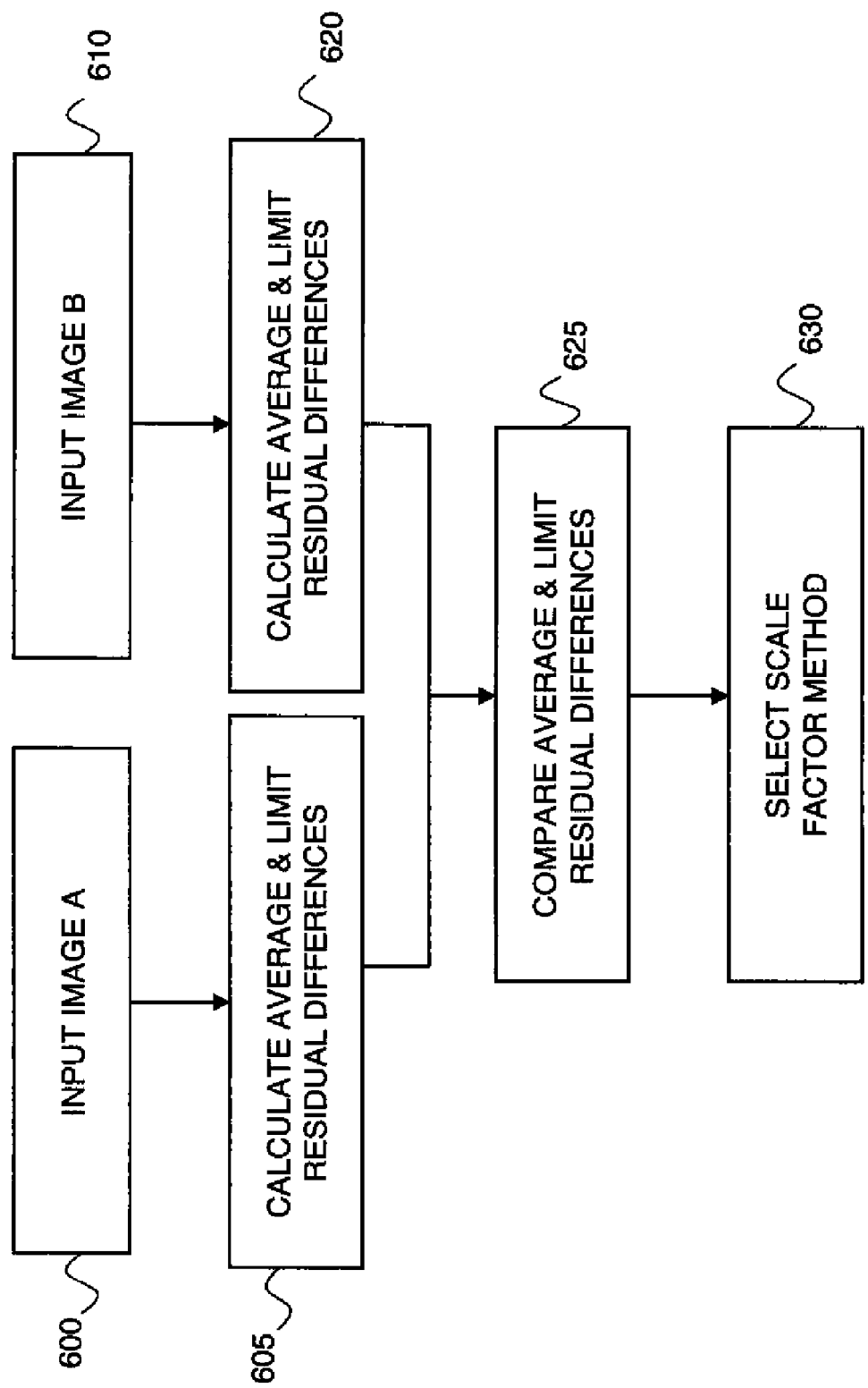
FIG. 11 is a flow diagram according to an embodiment of a portion of the method of the present invention.

It is helpful to distinguish between still and motion image sequences or to determine when a motion image sequence has a scene change, thus permitting the common scale factor to be optimized. Referring to FIG. 11, abrupt changes in image-signal content can be determined by inputting a first image 600, inputting 610 a second image, calculating the average and the limit values for each image (605, 620), and comparing 625 the differences between the average and maximum residual values for the two images. The difference between the average and the limit value of the one image and the subsequent image indicates the magnitude of the image content change and the scale factor can be selected 630 accordingly.

Figure 12:
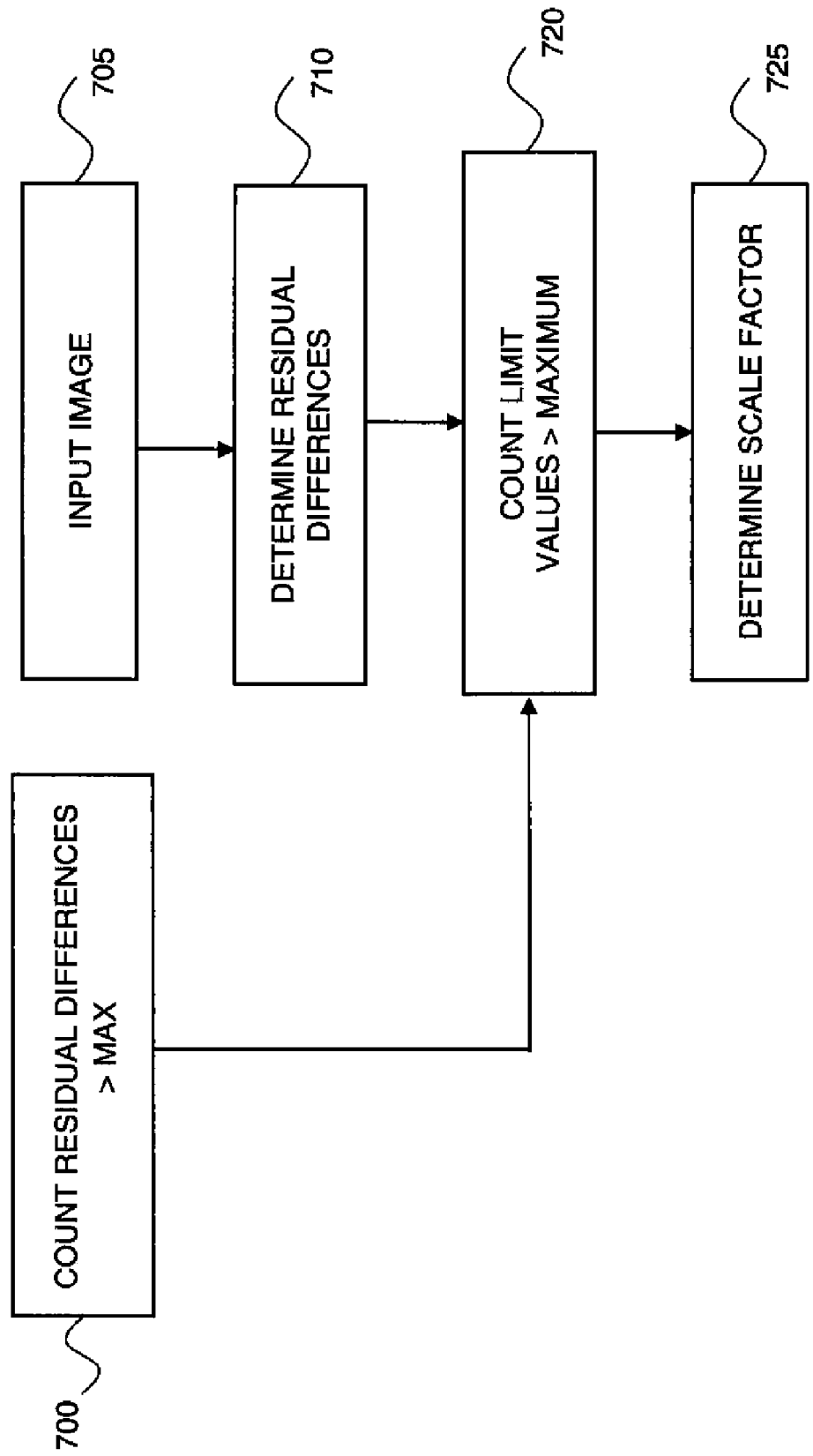
FIG. 12 is a flow diagram according to an embodiment of a portion of the method of the present invention.
Figure 13B:
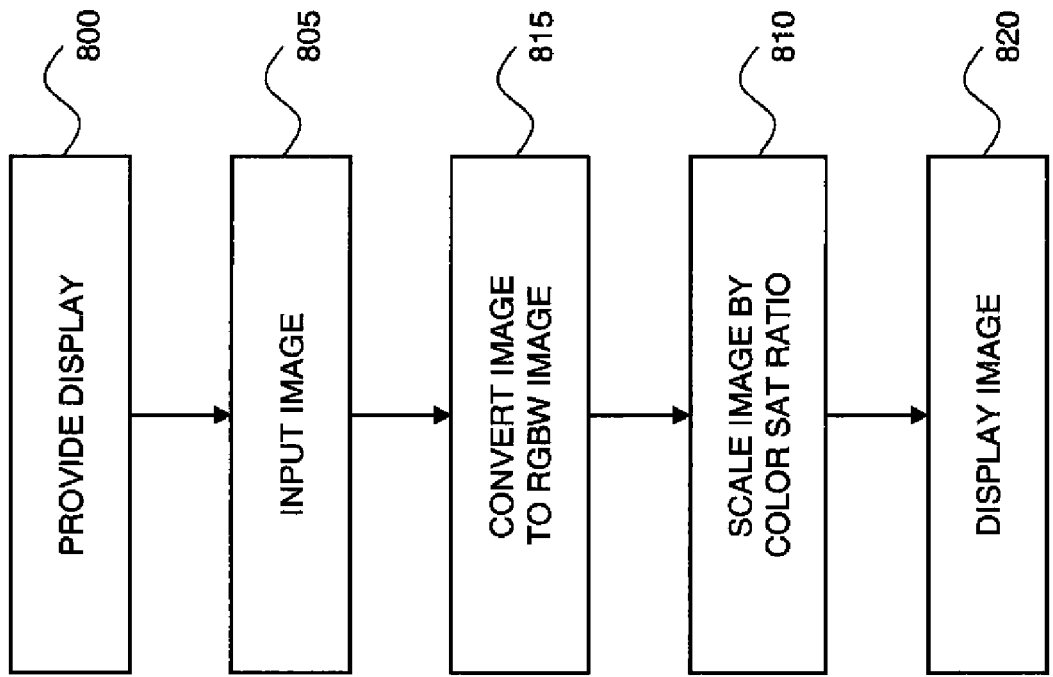
FIG. 13A and FIG. 13B are flow diagrams according to an embodiment of the method of the present invention.
Figure 13A:
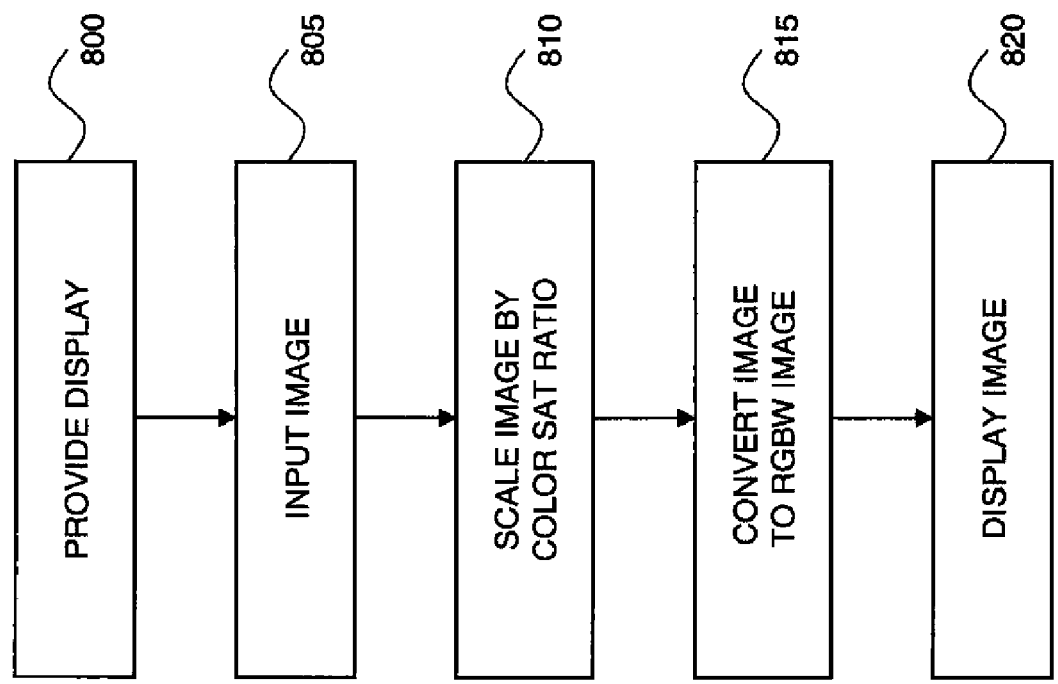

Referring to FIG. 12, a reduced common scale factor can be determined. An image is input 705 and the residual-difference values determined 710. The number of residual differences greater than a predetermined 700 maximum residual-difference value is counted 720. The reduced common scale factor is determined 725 in response to the number of residual-difference values using methods such as those provided in the embodiments described a above. Referring to FIG. 13A, according to the present invention, a method for displaying an input image signal on a four-color display, the four-color display having red, green, blue, and white sub-pixels, includes the steps of providing 800 a four-color display having red, green, blue sub-pixels having peak luminance values and chromaticity coordinates specifying a display color gamut volume and white sub-pixels having a peak luminance, receiving 805 a three-color input signal specifying a maximum input color saturation and luminance within the display color gamut volume, scaling 810 the input signal by the ratio of the maximum display color saturation to the maximum input color saturation, converting 815 the input signal to a four-color output signal having red, green, blue, and white components, and driving 820 the display with the four-color output signal. As noted above, the step of converting a three-color-component image input signal to a four-color-component image signal can be performed before (as in FIG. 13B), or after, the scaling step 810 (as in FIG. 13A), or the image input signal can be a four-color-component signal (in which case the conversion step 815 makes no change in the signal or is not included).

As demonstrated through examples, embodiments of the present invention can provide a four-color display 10 including a plurality of pixels 15 each having red, green, blue and white sub-pixels 20R, 20G, 20B, 20W and an apparatus (e.g. a controller 25) for receiving an image input signal 30, processing the input signal 30 to form a drive signal 35 that applies a plurality of red, green, blue and white color signal components to each sub-pixel, so that the color signal components are displayed at a peak luminance greater than the combined display peak luminance of the red, green, and blue sub-pixels without color error. The four-color display can further includes a structure for sequentially providing a plurality of sequential images to the pixels so that the maximum luminance of one of the sequential images is higher than the combined display peak luminance of the other sequential images and the one of the sequential images is displayed without color error. Furthermore, the peak luminance of the white sub-pixel can be higher than the combined peak luminance of the red, green, and blue sub-pixels.

Figure 14:
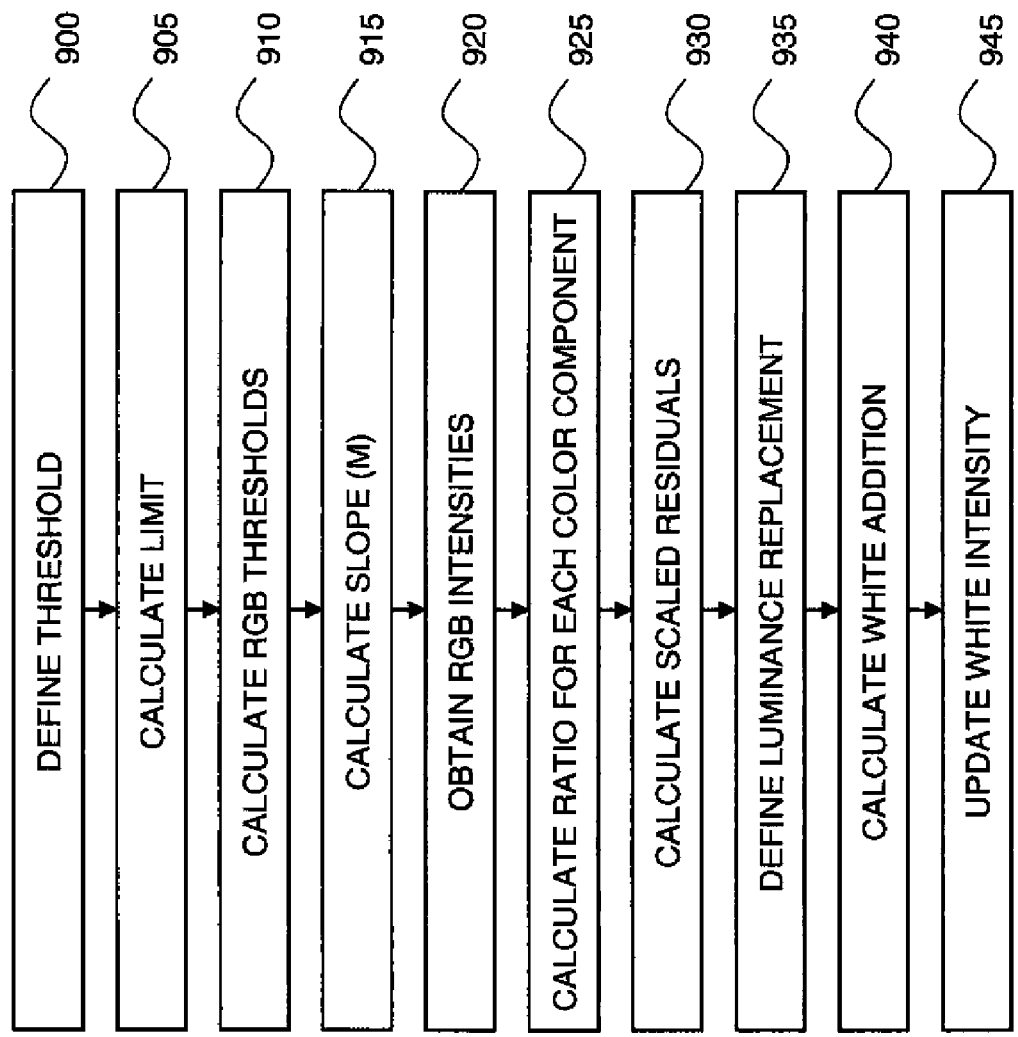
FIG. 14 is a flow diagram of a method for controlling the color error that can be introduced within some embodiments of the present invention.

As discussed earlier, some embodiments of the present invention can introduce color error by clipping 230 residual values as shown in FIG. 5. As noted earlier, if only a few percent of pixels in the image are clipped, this manipulation can yield an acceptable image. However, the quality of the resulting image can be improved by applying a method to limit the peak values in a gradual fashion. This method can be particularly useful when some proportion of the pixels is intentionally clipped. This method can be executed against panel intensity values before determining residuals or it can be applied against the residuals. The example provided here, assumes that it is applied to the panel intensity values. A method for providing such a limit is illustrated in FIG. 14. As shown in this figure, a threshold is defined 900. This threshold is the proportion of the remainder of each of the RGB intensity values above which the slope of a function plotting panel intensity output as a function of panel intensity input will be reduced. To provide an example, a value of 0.7 will be assumed for this value.

Limits (RGBlim) for the red, green, and blue panel intensity values are then calculated 905 as a proportion of the peak value. These limits can be calculated by computing the ratio of the peak panel intensity values as shown in Table 1 divided by the maximum panel intensity value for each color component. Within a worked example, maximum panel intensity values of 1.4, 1, and 1.1 will be assumed for the peak panel intensity values. Applying these values and the peak panel intensities of 1.121, 1.000, and 1.031 for the red, green and blue color components, the limits are determined to be 0.8007, 1.00, and 0.9373. RGB threshold values (rgbthresh) are then calculated 910 by multiplying the threshold defined in step 900 by the limits for the red, green, and blue panel intensity values, providing values of 0.5605, 0.7000, and 0.6561. A slope value m is then calculated 915 for each of the three color components as:

$$m_{RGB} = (1 - RGB\text{lim})/(1 - rgb\text{thresh})$$

In this example, the slope values are 0.4534, 0, and 0.1824. The red, green, and blue panel intensities within the four-or-more color signal are then obtained 920. For this example, the panel intensity values shown in Table 11 will be used within this example. However, it should be noted that during application of this limiting method, these example intensity values represent RGBW intensity values that result from converting the three-color-component image signal to a four-or-more-color-component image signal.

TABLE 11

Example Intensity Values

| Red Intensity | Green Intensity | Blue Intensity | White Intensity |
| --- | --- | --- | --- |
| 0.2 | 0.2 | 0 | 0.5 |
| 0 | 0 | 0.8 | 0.5 |
| 0.7 | 1 | 0 | 0.5 |
| 0 | 1 | 1.1 | 0.5 |
| 1.4 | 1 | 0 | 0.5 |

A ratio $T_{RGB}$ is then calculated 925 for each of the RGB residuals as:

$$T_{RGB}=1-m_{RGB}*(R_{RGB}-rgb\text{thresh});$$

for all red, green, and blue panel intensities (Rrgb) greater than RGBthresh and 1 otherwise. For the example, this results in the values shown in Table 12.

TABLE 12

Ratio Values

| $T_R$ | $T_G$ | $T_B$ |
| --- | --- | --- |
| 1.000 | 1.000 | 1.000 |
| 1.000 | 1.000 | 0.974 |
| 0.947 | 1.000 | 1.000 |
| 1.000 | 1.000 | 0.919 |
| 0.619 | 1.000 | 1.000 |

The scaled panel intensities are then computed 930 from:

$$SR_{RGB}=\min(T_{RGB})*R_{RGB}.$$

TABLE 13

Scaled Red, Green, and Blue Panel Intensities

| $T_R$ | $T_G$ | $T_B$ |
| --- | --- | --- |
| 0.20 | 0.20 | 0 |
| 0 | 0 | 0.78 |
| 0.66 | 0.94 | 0 |
| 0 | 0.92 | 1.01 |
| 0.87 | 0.62 | 0 |

This multiplication provides scaled panel intensity values and the use of the minimum function permits this manipulation to occur without producing hue changes in the resulting values. These values could be used to drive the display with an improved image. However, this method can reduce the luminance of the peak RGB values somewhat. This loss of luminance can be at least partially compensated for by adding some additional luminance from the white pixel to these colors. This addition can trade a loss of RGB luminance for some desaturation of the RGB values that are outside the range that the display can produce. To accomplish this, a portion of the linear intensity to be replaced by the white channel, specifically the luminance replacement ($W_{rep}$) proportion, is defined 935. Wrep will be between 0 and 1 and can be optimized by the system designer to achieve the maximum image quality. It has been determined that values in the range of 0.2 to 0.5 improves detail within the image without producing large changes in perceived saturation and therefore result in high image quality. For the current example, $W_{rep}$ can be assigned a value of 0.3. The value to be added to the white channel ($W_{add}$) is then calculated 940 by the following equation:

$$W_{add}=\text{sum}_{RGB}((1-\min(T_{RGB}))*W_{rep}*R_{RGB}*L)$$

Where $\text{sum}_{RGB}$, represents summing the resulting values for the red, green, and blue channels and L is the proportion of the luminance of the white point of the display produced by each of the red, green, and blue channels (e.g., the second row within the phosphor matrix divided by 100 or for this example 0.2126 for red, 0.7152 for green and 0.0722 for blue). The final panel intensity value for the white channel is then computed by adding $W_{add}$ to the original panel intensity value for the white channel and the white panel intensity updated 945. This updated value can then be added to the drive value for the additional light-emitting element. The final intensity values after this limiting function are shown in Table 13. As shown, the largest limiting value is applied to the red, green, and blue intensity values within the last row of this table and the white intensity is increased the most for this particular value. In some embodiments, luminance from the W sub-pixel cannot be added to replace luminance from the red, green, and blue. When replacement does occur, the panel intensity for the white sub-pixel necessary to perform this replacement can be higher than can be achieved by the display, in which case the W channel can be clipped or the common scale factor can be decreased. However, each of these conditions is quite rare for typical input image signals.

TABLE 13

Output Intensity Values

| Red Intensity | Green Intensity | Blue Intensity | White Intensity |
| --- | --- | --- | --- |
| 0.20 | 0.20 | 0 | 0.50 |
| 0 | 0 | 0.78 | 0.50 |
| 0.66 | 0.94 | 0 | 0.52 |
| 0 | 0.92 | 1.01 | 0.52 |
| 0.87 | 0.62 | 0 | 0.62 |

The present invention can be practiced to provide images for driving any display having four, or more, colors of light-emissive elements. However, it is particularly useful for reducing power in emissive full-color information-display devices. It is known to form EL displays, particularly OLED displays, having four, or more, colors of light-emitting elements for power reduction purposes and the method of the present invention can provide four, or more, color EL displays having further reduced power consumption as discussed earlier. These displays can be either active- or passive-matrix devices. In a preferred embodiment, the present invention is employed in a flat-panel OLED device composed of small-molecule or polymeric OLEDs as disclosed in, but not limited to U.S. Pat. No. 4,769,292 to Tang et al., and U.S. Pat. No. 5,061,569 to VanSlyke et al. Inorganic devices, for example, employing quantum dots formed in a polycrystalline semiconductor matrix (for example, as taught in U.S. Patent Application Publication No. 2007/0057263 by Kahen), and employing organic or inorganic charge-control layers, or hybrid organic/inorganic devices can be employed. Many combinations and variations of organic or inorganic light-emitting displays can be used to fabricate such a device, including both active- and passive-matrix displays having either a top- or a bottom-emitter architecture.

The invention has been described in detail with particular reference to certain preferred embodiments thereof, but it should be understood that variations and modifications can be effected within the spirit and scope of the invention.

PARTS LIST

| | |
|---|---|
| 10 | display |
| 15 | pixel |
| 20R | red sub-pixel |
| 20G | green sub-pixel |
| 20B | blue sub-pixel |
| 20W | white sub-pixel |
| 25 | controller |
| 30 | three component color image signal |
| 35 | drive signal |
| 40 | portion of an OLED display |
| 42R | red sub-pixel electrode |
| 42G | green sub-pixel electrode |
| 42B | blue sub-pixel electrode |
| 42W | white sub-pixel electrode |
| 44R | red sub-pixel circuit |
| 44G | green sub-pixel circuit |
| 44B | blue sub-pixel circuit |
| 44W | white sub-pixel circuit |
| 46 | drive line |
| 48 | select row |
| 50 | select TFT |
| 52 | capacitor |
| 54 | power TFT |
| 56 | power line |
| 60 | luminance output for red sub-pixel |
| 62 | luminance output for green sub-pixel |
| 64 | luminance output for blue sub-pixel |
| 66 | luminance output for white sub-pixel |
| 100 | provide display step |
| 105 | input image step |
| 110 | determine residual difference step |
| 115 | determine limit value step |
| 120 | determine scale factor step |
| 125 | input image step |
| 130 | scale image step |
| 135 | convert image to RGBW step |
| 140 | display image step |
| 150 | obtain chromaticity coordinates step |
| 152 | define display white point step |
| 154 | calculate phosphor matrix step |
| 156 | calculate white point and RGB luminance value step |
| 158 | form lookup tables step |
| 160 | determine panel intensity offset step |
| 162 | determine maximum W intensity step |
| 164 | select maximum scale factor step |
| 170 | determine min step |
| 172 | subtract result step |
| 174 | subtract panel intensity offsets step |
| 176 | set value step |
| 200 | set initial scale factor and control parameters step |
| 205 | acquire input signal step |
| 210 | convert to panel intensities step |
| 215 | scale panel intensities step |
| 220 | convert to RGBW step |
| 225 | calculate control parameters step |
| 230 | clip residuals step |
| 235 | count number of residuals clipped |
| 240 | drive display step |
| 245 | end of frame test step |
| 250 | calculate average panel intensities step |
| 255 | test clipped pixels count step |
| 260 | test scene change step |
| 265 | slowly decrement scale factor step |
| 270 | rapidly decrement scale factor step |
| 275 | test max residual value step |
| 280 | test scene change step |
| 290 | slowly increment scale factor step |
| 295 | test scale factor step |
| 300 | set scale factor to maximum step |
| 305 | rapidly increment scale factor step |
| 310 | store control parameters step |
| 350 | scale factor |

PARTS LIST -continued

| | |
|---|---|
| 355 | scale factor |
| 400 | determine peak display value step |
| 405 | determine pixel minimum |
| 410 | determine residual difference step |
| 415 | determine limit value step |
| 420 | divide peak value by maximum difference step |
| 500 | input predetermined image step |
| 505 | determine maximum scale factor step |
| 510 | set scale factor step |
| 515 | scale image and calculate residual errors step |
| 520 | test residual errors step |
| 525 | decrement scale factor step |
| 530 | test scale factor step |
| 535 | increment scale factor step |
| 600 | input image A step |
| 605 | calculate average and max residual differences step |
| 610 | input image B step |
| 620 | calculate average and max residual differences step |
| 625 | compare average and limit values step |
| 630 | select scale factor method step |
| 700 | count residual difference > max step |
| 705 | input image step |
| 710 | determine residual difference values step |
| 720 | count residual difference values greater than maximum step |
| 725 | determine scale factor |
| 800 | provide four color display step |
| 805 | receive three color input signal step |
| 810 | scale step |
| 815 | convert input signal step |
| 820 | drive step |
| 900 | define threshold step |
| 905 | calculate limit step |
| 910 | calculate threshold values step |
| 915 | calculate slope value step |
| 920 | obtain panel intensities step |
| 925 | calculate ratio step |
| 930 | compute scaled panel intensities |
| 935 | define white replacement proportion |
| 940 | calculate white panel intensity increment |
| 945 | update white panel intensity |

The invention claimed is:

1. A method of converting a three-or-more-color-component image input signal to an image output signal for controlling a display device, the method comprising:

acquiring the image input signal including a plurality of pixel signals, each pixel signal comprising three or more color components;

determining respective residual differences for each color component of each pixel signal, the determining respective residual differences comprising:

determining a minimum panel intensity value for each color component of each pixel;

subtracting the minimum panel intensity values from respective color component panel intensity values; and subtracting panel intensity offset values from corresponding color component panel intensity values, where values obtained from subtracting the panel intensity offset values that are less than zero (0) are set to equal zero (0);

determining a limit value of the residual differences, the limit value comprising a maximum value among the determined respective residual differences;

calculating a common scale factor for each of the color components, based upon the limit value, the common scale factor comprising the lesser of:

an inverse of the limit value; and a maximum common scale factor comprising a maximum intensity value for a white color component; and applying the common scale factor to the image input signal to produce the image output signal.

2. The method of claim 1, wherein either the image input signal or the image output signal comprises a three-color-component image signal; and further comprising converting the three-color-component image signal to a four-color-component image signal.

3. The method of claim 1, wherein the residual differences are determined by calculating the difference between each pixel signal for each color component and the color component limit value for each respective pixel signal.

4. The method of claim 1, wherein the common scale factor is determined by dividing a peak display value by the limit value for a plurality of pixel signals.

5. The method of claim 1, wherein:
the image input signal's pixel signals' color components include red, green, and blue; or
the image output signal comprises a plurality of pixel signals, each pixel signal comprising color components including red, green, blue, and white.

6. The method of claim 1, wherein the common scale factor is equal to or greater than 1.

7. The method of claim 2, wherein the determining respective residual differences for each pixel signal comprises the converting the three-color-component image signal to a four-color-component image signal.

8. A four-color color display, comprising:
a plurality of pixels each comprising red, green, blue, and white sub-pixels; and
a controller configured to apply a plurality of red, green, blue, and white color signal components to each sub-pixel, such that the color signal components are displayed without color error at a peak luminance greater than a combined display peak luminance of the red, green, and blue sub-pixels, the controller being further configured for:
acquiring an image input signal including a pixel signal for each sub-pixel, each pixel signal comprising three or more color components;
determining respective residual differences for each color component of each pixel signal, the determining respective residual differences comprising:
determining a minimum panel intensity value for each color component of each pixel;
subtracting the minimum panel intensity values from respective color component panel intensity values; and
subtracting panel intensity offset values from corresponding color component panel intensity values, where values obtained from subtracting the panel intensity offset values that are less than zero (0) are set to equal zero (0);
determining a limit value of the residual differences, the limit value comprising a maximum value among the determined respective residual differences;

calculating a common scale factor for each of the color components, based upon the limit value, the common scale factor comprising the lesser of:
an inverse of the limit value; and
a maximum common scale factor comprising a maximum intensity value for a white color component; and
applying the common scale factor to the image input signal to produce an image output signal.

9. The four-color display of claim 8, further comprising a circuit configured to sequentially provide a plurality of sequential images to the pixels such that:
a maximum luminance of one of the sequential images is higher than a combined display peak luminance of the other sequential images; and
the one of the sequential images is displayed without color error.

10. The four-color display of claim 8, wherein a peak luminance of the white sub-pixel is higher than the combined peak luminance of the red, green, and blue sub-pixels.

11. A method for displaying an input image signal on a display, the four-color display comprising red, green, blue, and white sub-pixels, comprising:
providing a four-color display comprising:
red, green, and blue sub-pixels receiving pixel signals comprising peak values and chromaticity coordinates specifying a display color gamut volume;
white sub-pixels comprising a peak luminance;
receiving a three-color input signal specifying a maximum input color saturation and luminance within the display color gamut volume;
scaling the input signal by the ratio of a maximum display color saturation to the maximum input color saturation, the scaling comprising:
determining respective residual differences for each color component of each pixel signal, the determining respective residual differences comprising:
determining a minimum panel intensity value for each color con each pixel;
subtracting the minimum panel intensity values from respective, component panel intensity values; and
subtracting panel intensity offset values from corresponding color component panel intensity values, where values obtained from subtracting the panel intensity offset values that are less than zero (0) are set to equal zero (0);
determining a limit value of the residual differences, the limit value comprising a maximum value among the determined respective residual differences; and
calculating a common scale factor for each of the color components, based upon the limit value, the common scale factor comprising the lesser of:
an inverse of the limit value; and
a maximum common scale factor comprising a maximum intensity value for a white color component;
converting the input signal to a four-color output signal comprising red, green, blue, and white components; and
driving the display with the four-color output signal.

* * * * *